US006853609B2

(12) United States Patent
Kusumoto et al.

(10) Patent No.: US 6,853,609 B2
(45) Date of Patent: Feb. 8, 2005

(54) OPTICAL DISC DRIVE

(75) Inventors: Kunimasa Kusumoto, Saijo (JP); Mitsuteru Fujimoto, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 526 days.

(21) Appl. No.: 09/979,044

(22) PCT Filed: Mar. 16, 2001

(86) PCT No.: PCT/JP01/02098

§ 371 (c)(1),
(2), (4) Date: Mar. 15, 2002

(87) PCT Pub. No.: WO01/69596

PCT Pub. Date: Sep. 20, 2001

(65) Prior Publication Data

US 2002/0105865 A1 Aug. 8, 2002

(30) Foreign Application Priority Data

Mar. 17, 2000 (JP) ........................ 2000-076970

(51) Int. Cl.$^7$ ................................ G11B 7/00
(52) U.S. Cl. .................. 369/44.29; 369/44.26; 369/53.28
(58) Field of Search .................. 369/44.27, 44.28, 369/44.29, 44.35, 44.34, 44.26, 53.1, 53.2, 53.28

(56) References Cited

U.S. PATENT DOCUMENTS 6,687,202 B1 * 2/2004 Watanabe et al. ........ 369/44.34

FOREIGN PATENT DOCUMENTS

| EP | 0833311 B1 | 4/1998 |
| JP | 5-144033 | 6/1993 |
| JP | 5-159318 | 6/1993 |
| JP | 5-159326 | 6/1993 |
| JP | 5-314522 | 11/1993 |
| JP | 6-333248 | 12/1994 |
| JP | 7-287855 | 10/1995 |
| JP | 9-128767 | 5/1997 |
| JP | 9-180209 | 7/1997 |
| JP | 11-296880 | 10/1999 |

* cited by examiner

Primary Examiner—Nabil Hindi
(74) Attorney, Agent, or Firm—Wenderoth, Lind & Ponack, L.L.P.

(57) ABSTRACT

The present invention relates to loop gain adjustment of a focus/tracking servo in an optical disk apparatus, and provides an optical disk apparatus which can make the loop gain adjustment converge normally even in an optical disk in which prerecorded areas and recorded areas are mixed, and further which always has a stable servo system even when a gain is significantly varied due to changes in the disk state.

When an inserted optical disk is determined to be a recordable optical disk by an optical disk type determination means 22, an optical pickup 1 is made seek a previously set area, thereby performing the loop gain adjustment. Further, when a gain is varied during the operation, a gain adjusting means 10 changes over a gain adjustment value.

17 Claims, 21 Drawing Sheets

OPTICAL DISC DRIVE

TECHNICAL FIELD

The present invention relates to an optical disk apparatus, that is, an optical recording/reproducing apparatus which optically records or erases a signal on or from a recording medium, or reproduces a signal from the recording medium, by employing a light source such as a laser and, more particularly, to loop gain adjustment for a focus/tracking servo, utilized in an optical disk apparatus which employs a recordable optical disk such as a write-once optical disk like a CD-R (Compact Disc-Recordable) or a rewritable optical disk like a CD-RW (Compact Disk-ReWritable).

BACKGROUND ART

In recent years, in a control system for an optical recording/reproducing apparatus (hereinafter, merely referred to as "optical disk apparatus"), for example with regard to loop gain control, various automatic adjustment functions or learning functions in which microcomputers are introduced have been developed. An optical disk apparatus which is provided with a loop gain adjustment function employing a microcomputer is disclosed for example in Japanese Published Patent Application No. Hei. 5-159318 or No. Hei. 5-159326. In these apparatuses, the loop gain adjustment is performed in both of a rewritable area (RW area) and a read-only memory area (ROM area) in one recording medium.

Hereinafter, a conventional optical disk apparatus will be described.

FIG. 22 is a block diagram illustrating a structure of the conventional optical disk apparatus.

In the figure, numeral 1 denotes an optical pickup, numeral 2 denotes a spindle motor, numeral 3 denotes an optical disk, numeral 4 denotes an RF amplifier, numeral 5 denotes a phase compensating circuit, numeral 6 denotes a composing circuit, numeral 7 denotes a D/A converter, numeral 8 denotes an A/D converter, numeral 9 denotes a microcomputer, numeral 10 denotes a gain adjusting circuit, numeral 11 denotes a driving circuit, and numeral 20 denotes a servo part.

The optical pickup 1 comprises a laser light source such as a laser diode; optical components such as a collimator lens, an objective lens, a polarized beam splitter and a cylindrical lens; a photo detector having a photoreceiving part of a prescribed pattern and the like, and the objective lens is driven by a biaxial actuator.

The optical pickup 1 detects a reflected light of a laser which is applied to a target track of the optical disk 3 rotated by the spindle motor 2, and sends this detection signal to the RF amplifier 4. The detection signal includes a reproduction signal for a difference in the quantity of a reflected light of a laser beam from the target track at reproduction, a focus error signal based on an astigmatism method, a tracking error signal based on a push-pull method, and address information based on a wobbling groove.

A focus servo error signal and a tracking servo error signal generated by the RF amplifier 4 are inputted via the phase compensating circuit 5 which compensates the phase of a control system to the composing circuit 6 for gain adjustment.

The microcomputer 9 outputs a disturbance signal through the D/A converter 7 to apply disturbance to the control system through the composing circuit 6. A reply signal for the applied disturbance is inputted to the microcomputer 9 through the A/D converter 8. A loop gain or a phase of the control system is calculated by arithmetic on the basis of the disturbance signal and the reply signal, and its value is outputted to the gain adjusting circuit 10 to change a resistance value in the gain adjusting circuit 10, thereby setting an optimum gain.

When the optimum gain is set, a driving signal for a focus and tracking actuator, outputted from the servo part 20 which comprises the phase compensating circuit 5, the composing circuit 6 and the gain adjusting circuit 10, is inputted to the driving circuit 11, thereby controlling the actuator.

Here, the conventional loop gain adjustment method for an optical disk on which RW areas and ROM areas are mixed will be described with reference to a flowchart shown in FIG. 23.

First, when the optical disk apparatus is started or an optical disk is mounted, the spindle motor is turned ON and the laser is turned ON (Step S101), thereby starting a spinup operation.

Next, after the focus servo is turned ON (Step S102), the tracking servo is turned ON (Step S103) and then the track hold operation is started (Step S104). First, seek to an adjustment track in the RW area is performed (Step S105), thereby performing offset adjustment and gain adjustment (Steps S106 and S108), and respective adjustment values are stored (Steps S107 and S109). Next, seek to an adjustment track in the ROM area is performed (Step S110), thereby performing offset adjustment and gain adjustment as in the RW area (Steps S111 and S113), and respective adjustment values are stored (Steps S112 and S114). These adjustment values are stored in a storage means.

When the loop gain adjustment is ended, a recording or reproducing operation is started next. When a recording or reproducing command is inputted (Step S115), a target track is retrieved (Steps S116 and S119), and it is determined whether the target track is in the RW area or the ROM area. When the target track is in the RW area, offset and gain setting for the RW area is performed (steps S117 and S118) while when the target track is in the ROM area, offset and gain setting for the ROM area is performed (Steps S120 and S121). Then, the retrieval is completed (Step S122) and then the recording or reproducing operation is started (Step S123).

The conventional loop gain adjustment method is constructed as described above, so that even when areas of various light reflectances exist on an optical disk, the loop gain can be set accurately.

However, in the prior art, there is a possibility that prerecorded areas and recorded areas are mixed in a recordable optical disk such as a CD-R as the write-once optical disk or a CD-RW as the rewritable optical disk, and when the optical pickup is moved from the prerecorded area to the recorded area or from the recorded area to the prerecorded area during the loop gain adjustment, the loop gain adjustment may not converge normally.

Further, there is a possibility that prerecorded areas and recorded areas are mixed in a RW area of a recordable optical disk such as a CD-R and a CD-RW or an optical disk on which RW areas and ROM areas are mixed, and when the optical pickup operates in this area, a prerecorded area and a recorded area have different quantities of a reflected light from the optical disk, whereby a loop gain may be varied even in the RW area of the optical disk on which the RW areas and the ROM areas are mixed. For example, when the loop gain adjustment is performed in the recorded area and the optical pickup operates in the prerecorded area, or when the loop gain adjustment is performed in the prerecorded area and the optical pickup operates in the recorded area, the loop gain is varied and the control performance is deteriorated, whereby the servo system may become unstable.

The present invention is made to solve the above-mentioned problems and has for its object to provide an optical disk apparatus which makes the loop gain adjustment converge normally even in an optical disk on which prerecorded areas and recorded areas are mixed and further has a servo system which is always stable even when a gain is significantly varied due to changes in the state of the optical disk.

DISCLOSURE OF THE INVENTION

To solve the above-described problems, according to claim 1 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk based on the detection signal; a focus servo control means for performing a control so as to make a convergence state of the laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; and a driving signal outputting means for outputting a driving signal to control the optical pickup, on the basis of the focus error signal and the tracking error signal, in which at start of the apparatus or mounting of the optical disk, when the type of the optical disk is determined by the optical disk type determination means to be a recordable optical disk, the optical pickup is made seek a previously set area, thereby performing loop gain adjustment.

According to the invention, the optical pickup is made perform the loop gain adjustment in an area where a prerecorded or recorded disk state has continuity such as a lead-in area. Therefore, there is no movement to an area of a different disk state during the loop gain adjustment, and the adjusting operation can normally converge.

According to claim 2 of the present invention, in the optical disk apparatus as defined in claim 1, an area where a prerecorded or recorded disk state in the recordable optical disk has continuity is employed as the previously set area.

According to claim 3 of the present invention, in the optical disk apparatus as defined in claim 1, a lead-in area is employed as the previously set area.

According to claim 4 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk based on the detection signal; a presence-or-absence-of-optical-disk-recorded-area determination means for determining a presence or an absence of a recorded area in the optical disk, when the optical disk is determined to be a recordable optical disk by the optical disk type determination means; an operation area determination means for determining whether an area where the optical pickup is operating is a prerecorded area or a recorded area, based on the detection signal; a focus servo control means for performing a control so as to make a convergence state of the optical laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; an adjustment value storage means which has a first adjustment value storage means and a second adjustment value storage means, each storing an adjustment value which is set in the gain adjusting means; and a driving signal outputting means for outputting a driving signal to control the optical pickup on the basis of the focus error signal and the tracking error signal, in which at start of the apparatus or insertion of the optical disk, when the optical disk is determined to be a recordable optical disk by the optical disk type determination means and the optical disk is determined to have a recorded area by the presence-or-absence-of-optical-disk-recorded-area determination means, loop gain adjustment is performed in a recorded area and a prerecorded area of the optical disk, the first adjustment value storage means stores an adjustment value which is set in the gain adjusting means when the loop gain adjustment is performed in the recorded area, and the second adjustment value storage means stores an adjustment value which is set in the gain adjusting means when the loop gain adjustment is performed in the prerecorded area.

According to the invention, when the optical disk is determined to be a recordable optical disk by the means for determining the type of the optical disk on the basis of a reflected light from the optical disk, and further the recorded area is determined to exist in the optical disk by the means for determining the presence or absence of an recorded area, the loop gain adjustment is performed in both of a prerecorded area and a recorded area in the optical disk, a fist adjustment value obtained in the recorded area and a second adjustment value obtained in the prerecorded area are stored in the first adjustment value storage means and the second adjustment value storage means, respectively, and the adjustment value is changed over according to changes in the disk state. Therefore, the adjustment value can be changed over even when states of the servo system in the prerecorded area and the recorded area are made significantly different from each other due to changes in the disk state, whereby an optical disk apparatus which always has a stable servo system can be obtained.

According to claim 5 of the present invention, in the optical disk apparatus as defined in claim 4, when the optical pickup is operated in a recorded area, the adjustment value in the first adjustment value storage means is set in the gain adjusting means, and when the optical pickup is operated in a prerecorded area, the adjustment value in the second adjustment value storage means is set in the gain adjusting means.

According to claim 6 of the present invention, in the optical disk apparatus as defined in claim 4, when the optical pickup is moved from a recorded area to a prerecorded area during operation, the adjustment value in the gain adjusting means is re-set from the adjustment value in the first adjustment value storage means to the adjustment value in the second adjustment value storage means, and when the optical pickup is moved from a prerecorded area to a recorded area during the operation, the adjustment value in the gain adjusting means is re-set from the adjustment value in the second adjustment value storage means to the adjustment value in the first adjustment value storage means.

According to claim 7 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk based on the detection signal; an operation area determination means for determining whether an area where the optical pickup is operating is a prerecorded area or a recorded area, based on the detection signal; a focus servo control means for performing a control so as to make a convergence state of the optical laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; an adjustment value storage means which has a first adjustment value storage means and a second adjustment value storage means, each storing an adjustment value which is set in the gain adjusting means; and a driving signal outputting means for outputting a driving signal to control the optical pickup on the basis of the focus error signal and the tracking error signal, in which at start of the apparatus or mounting of the optical disk, when the optical disk is determined by the optical disk type determination means to be a recordable optical disk, the optical pickup performs seek to a PMA (Program Memory Area) of the optical disk, to determine a presence or an absence of the recorded area, when the optical disk is determined to have a recorded area, loop gain adjustment is performed in a recorded area and a prerecorded area of the optical disk, the first adjustment value storage means stores an adjustment value which is set in the gain adjusting means when the loop gain adjustment is performed in the recorded area, and the second adjustment value storage means stores an adjustment value which is set in the gain adjusting means when the loop gain adjustment is performed in the prerecorded area.

According to the invention, when the disk is determined to be a recordable optical disk by the means for determining the type of the optical disk on the basis of a reflected light from the optical disk, the optical pickup is made seek the PMA of the optical disk, the presence or absence of the recorded area is determined on the basis of the presence or absence of track information in the PMA, when the recorded area exists in the optical disk the seek is performed to the recorded area and the loop gain adjustment is performed, a first adjustment value obtained by the loop gain adjustment is stored in the first adjustment value storage means, then the seek is performed to a prerecorded area to perform the loop gain adjustment, a second adjustment value obtained by the loop gain adjustment is stored in the second adjustment value storage means, and the adjustment value is changed over according to changes in the disk state. Therefore, the adjustment value can be changed over even when states of the servo system in the prerecorded area and the recorded area due to changes in the disk state are made greatly different from each other, whereby an optical disk apparatus which always has a stable servo system can be obtained.

According to claim 8 of the present invention, in the optical disk apparatus as defined in claim 7, when the optical pickup is operated in a recorded area, the adjustment value in the first adjustment value storage means is set in the gain adjusting means, and when the optical pickup is operated in a prerecorded area, the adjustment value in the second adjustment value storage means is set in the gain adjusting means.

According to claim 9 of the present invention, in the optical disk apparatus as defined in claim 7, when the optical pickup is moved from a recorded area to a prerecorded area during operation, the adjustment value in the gain adjusting means is re-set from the adjustment value in the first adjustment value storage means to the adjustment value in the second adjustment value storage means, and when the optical pickup is moved from a prerecorded area to a recorded area during the operation, the adjustment value in the gain adjusting means is re-set from the adjustment value in the second adjustment value storage means to the adjustment value in the first adjustment value storage means.

According to claim 10 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk, based on the detection signal; a focus servo control means for performing a control so as to make a convergence state of the laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; an adjustment value storage means for storing an adjustment value which is obtained by the loop gain adjustment; a post-loop-gain-adjustment-area determination means for determining whether an area where the loop gain adjustment has been performed is an prerecorded area or a recorded area; an operation area determination means for determining whether an area where the optical pickup is operating is an prerecorded area or a recorded area, on the basis of the reflected light; a correction value storage means for storing a previously set positive gain correction value; and a driving signal outputting means for outputting a driving signal to control the optical pickup, on the basis of the focus error signal and the tracking error signal, in which when a disk state of an area where the optical pickup is made perform seeking and a reproducing or recording operation is performed, which state has been determined by the operation area determination means, is different from a disk state of the area where the loop gain adjustment has been performed, which state has been determined by the post-loop-gain-adjustment-area determination means, the previously set gain correction value is subjected to a previously set arithmetic and then set in the gain adjusting means.

According to this invention, it is determined by the prerecorded/recorded determination means whether the area where the loop gain adjustment has been performed is a prerecorded area or a recorded area and further whether the operation area is a prerecorded area or a recorded area, and when the area at the loop gain adjustment has a different disk state from that of the operation area, a previously set arithmetic is performed to a previously set positive gain correction value, and it is set in the gain adjusting means. Therefore, even when the state of the servo system is greatly varied due to changes in the disk state, the loop gain is corrected by the correction value, whereby an optical disk apparatus which is always stable can be obtained.

According to claim 11 of the present invention, in the optical disk apparatus as defined in claim 10, when an area where the loop gain adjustment has been performed at start of the apparatus or mounting of the optical disk is a prerecorded area and an area where the optical pickup operates is a recorded area, the gain correction value which is set in the gain adjusting means has the same value as the previously set positive gain correction value, and when an area where the loop gain adjustment has been performed at start of the apparatus or insertion of the optical disk is a recorded area and an area where the optical pickup operates is a prerecorded area, a gain correction value which is set in the gain adjusting means has a value which is obtained by multiplying the previously set gain correction value by "−1".

According to claim 12 of the present invention, in the optical disk apparatus as defined in claim 10, when the gain is changed during the operation of the optical pickup, re-correction of the gain is performed in the gain adjusting means by employing the previously set gain correction value.

According to claim 13 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk based on the detection signal; a focus servo control means for performing a control so as to make a convergence state of the laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; an adjustment value storage means for storing an adjustment value which is obtained by the loop gain adjustment; a post-loop-gain-adjustment-area determination means for determining whether an area where the loop gain adjustment has been performed is an prerecorded area or a recorded area; an operation area determination means for determining whether an area where the optical pickup is operating is an prerecorded area or a recorded area, on the basis of the detection signal; a correction value storage means which has a first gain correction value storage means for storing a previously set positive first gain correction value and a second gain correction value storage means for storing a previously set negative second gain correction value; and a driving signal outputting means for outputting a driving signal to control the optical pickup on the basis of the focus error signal and the tracking error signal, in which when a disk state of the area where the optical pickup is made perform seeking and a reproducing or a recording operation is performed, which state has been determined by the operation area determination means, is different from a disk state of the area where the loop gain adjustment has been performed, which state has been determined by the post-loop-gain-adjustment-area determination means, the previously set first gain correction value or second gain correction value is set in the gain adjusting means.

According to this invention, it is determined by the prerecorded/recorded determination means whether the area where loop gain adjustment has been performed is a prerecorded area or a recorded area and further whether the operation area is a prerecorded area or a recorded area, and when the area at the loop gain adjustment has a different disk state from that of the operation area, gain correction is performed by using the previously set positive first gain correction value and negative second gain correction value. Therefore, even when the state of the servo system is significantly varied due to changes in the disk state, loop gain is corrected by the correction value, whereby an optical disk apparatus which is always stable can be obtained.

According to claim 14 of the present invention, in the optical disk apparatus as defined in claim 13, when an area where the loop gain adjustment has been performed at start of the apparatus or mounting of the optical disk is a prerecorded area and an area where the optical pickup operates is a recorded area, the gain correction value which is set in the gain adjusting means is the first gain correction value, and when an area where the loop gain adjustment has been performed at start of the apparatus or insertion of the optical disk is a recorded area and an area where the optical pickup operates is a prerecorded area, the gain correction value which is set in the gain adjusting means is the second gain correction value.

According to claim 15 of the present invention, in the optical disk apparatus as defined in claim 13, when the gain is changed during the operation of the optical pickup, re-correction of the gain is performed in the gain adjusting means by employing the previously set gain correction value.

According to claim 16 of the present invention, there is provided an optical disk apparatus comprising: an optical pickup for emitting a laser to an optical disk as a recording medium and outputting a detection signal according to a reflected light from the optical disk; an optical disk type determination means for determining a type of the optical disk based on the detection signal; a presence-or-absence-of-recorded-area determination means for determining a presence or an absence of a recorded area in the optical disk, when the optical disk is determined to be a recordable optical disk by the optical disk determination means; an operation area determination means for determining whether an area where the optical pickup is operating is an prerecorded area or a recorded area, on the basis of the detection signal; a focus servo control means for performing a control so as to make a convergence state of the optical laser emitted toward the optical disk constant, on the basis of a focus error signal which is obtained from the detection signal; a tracking servo control means for performing a control so that a convergence position of the optical laser is always located on a track of the optical disk, on the basis of a tracking error signal which is obtained from the detection signal; a gain adjusting means for performing loop gain adjustment of the focus servo control means and the tracking servo control means; an adjustment value storage means which has a first adjustment value storage means, a second adjustment storage means and a third adjustment value storage means, each storing an adjustment value set in the gain adjusting means; an arithmetic means for operating a third adjustment value by employing a first adjustment value stored in the first adjustment value storage means and a second adjustment value stored in the second adjustment value storage means; and a driving signal outputting means for outputting a driving signal to control the optical pickup, on the basis of the focus error signal and the tracking error signal, in which when the optical disk is determined to be a recordable optical disk by the optical disk determination means at start of the apparatus or insertion of the optical disk, and further the optical disk is determined to have a recorded area by the presence-or-absence-of-optical-disk-recorded-area determination means, loop gain adjustment is performed in a recorded area and a prerecorded area of the optical disk, a previously decided arithmetic is performed in the arithmetic means by employing the first adjustment value and the second adjustment value, and the third adjustment value which is obtained by the arithmetic is stored in the third adjustment value storage means.

According to this invention, when the optical disk is determined to be a recordable optical disk by the means for determining a type of the optical disk from a reflected light from the optical disk, and further it is determined by the means for determining the presence or absence of the recorded area in the optical disk that a recorded area exists, loop gain adjustment is performed in both of the prerecorded area and the recorded area in the optical disk, the fist adjustment value obtained in the recorded area and the second adjustment value obtained in the prerecorded area are stored in the first adjustment value storage means and the second adjustment value storage means, respectively, and a suitable third adjustment value is obtained in the prerecorded area and the recorded area by the arithmetic means by employing the first adjustment value band the second adjustment value. Therefore, it is possible to provide an optical disk apparatus which always has a stable servo system even when the state of the servo system is significantly varied due to changes in the disk state.

According to claim 17 of the present invention, in the optical disk apparatus as defined in claim 16, when the optical pickup is made perform a reproduction/recording operation, the third adjustment value stored in the third adjustment value storage means is set in the gain adjusting means.

BRIEF DESCRIPTION OF DRAWINGS

FIG. 4(*a*) shows a state where the optical disk is prerecorded completely, FIG. 4(*b*) shows a state where session close is not performed, and FIG. 4(*c*) shows a state where session close is performed.

BEST MODE TO EXECUTE THE INVENTION

Hereinafter, embodiments of the present invention will be described with reference to the drawings. The embodiments described here are only illustrative and the present invention is not restricted to these embodiments.

(Embodiment 1)

Hereinafter, a first embodiment of an optical disk apparatus according to the present invention will be described with reference to figures.

Figure 1:
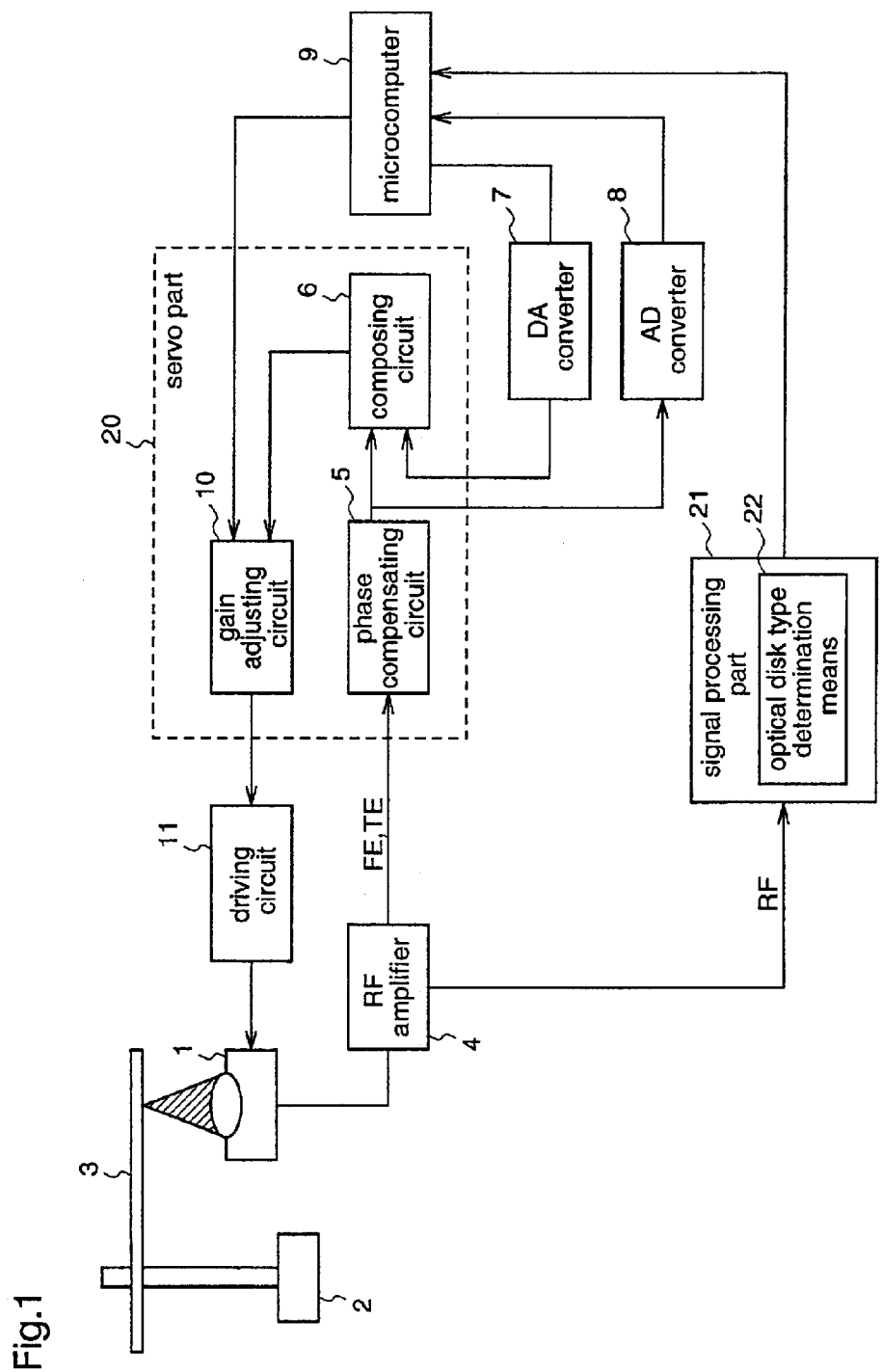
FIG. 1 is a block diagram illustrating a structure of an optical disk apparatus according to a first embodiment of the present invention.
Figure 22:
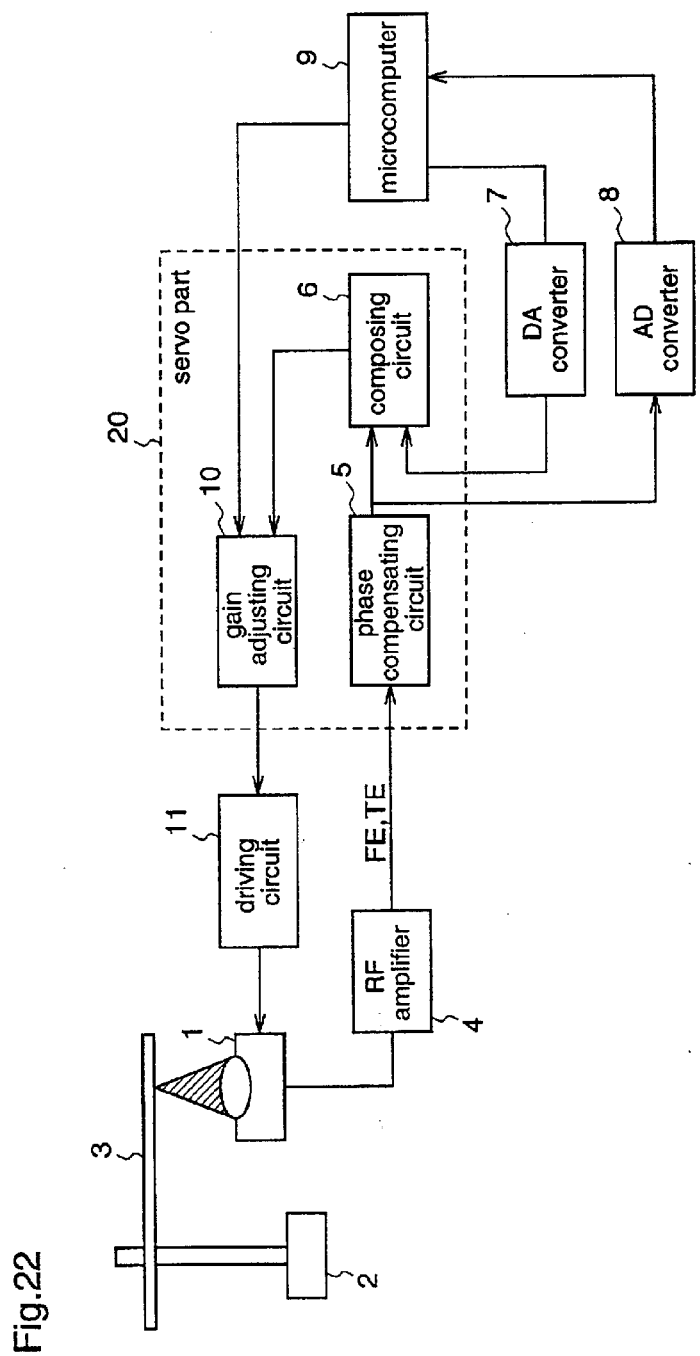
FIG. 22 is a block diagram illustrating a structure of a conventional optical disk apparatus.
Figure 23:
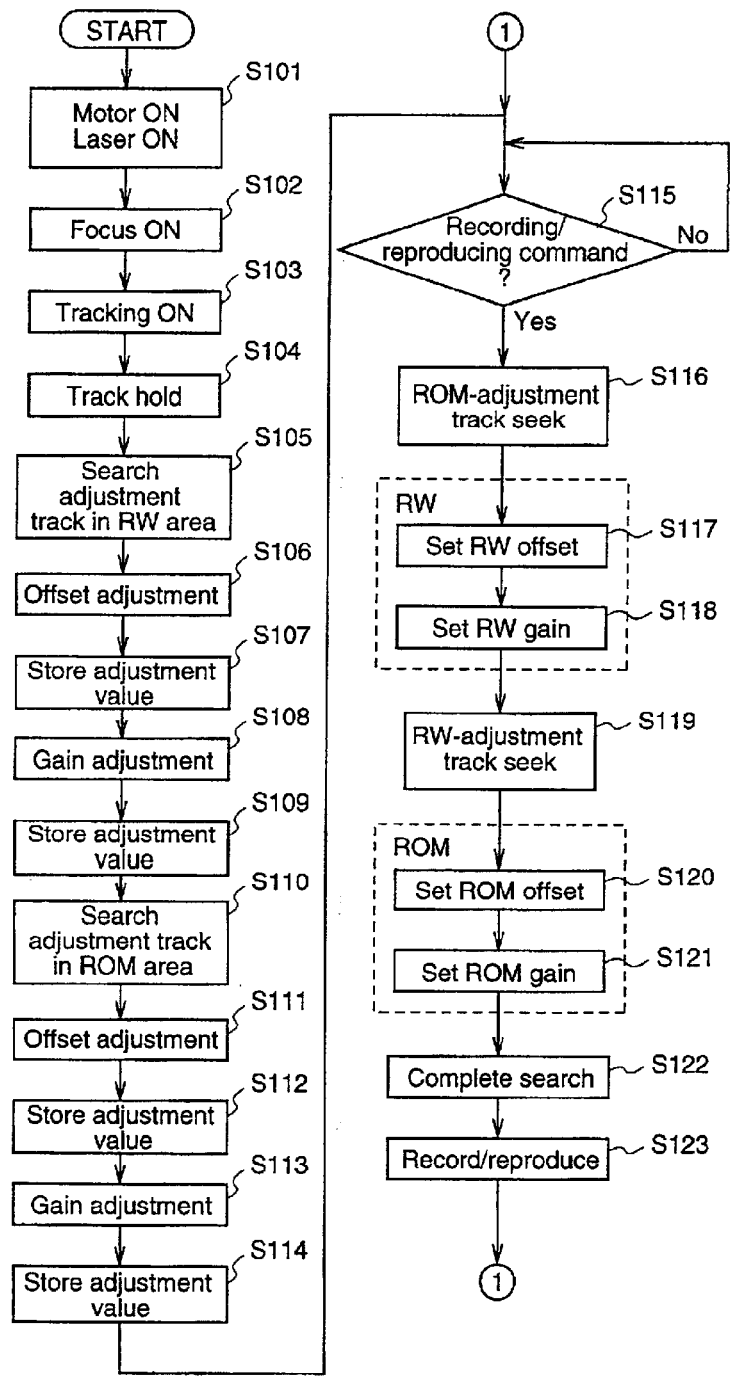
FIG. 23 is a flowchart for explaining a loop gain adjustment operation of the conventional optical disk apparatus.

FIG. 1 is a block diagram illustrating a structure of the optical disk apparatus according to the invention, and the same reference numerals as those of the conventional optical disk apparatus shown in FIG. 22 denote the same parts.

In FIG. 1, numeral 1 denotes an optical pickup, numeral 2 denotes a spindle motor, numeral 3 denotes an optical disk, numeral 4 denotes an RF amplifier, numeral 5 denotes a phase compensating circuit, numeral 6 denotes a composing circuit, numeral 7 denotes a D/A converter, numeral 8 denotes an A/D converter, numeral 9 denotes a microcomputer, numeral 10 denotes a gain adjusting circuit, numeral 11 denotes a driving circuit, numeral 20 denotes a servo part, and numeral 21 denotes a signal processing part having an optical disk type determination means 22.

The optical pickup 1 comprises a laser light source such as a laser diode; optical components such as a collimator lens, an objective lens, a polarized beam splitter and a cylindrical lens; a photo detector having a photoreceiving part of a prescribed pattern and the like, and the objective lens is driven by a biaxial actuator (not shown).

The optical pickup 1 detects a reflected light of a laser which is applied to a target track of the optical disk 3 rotated by the spindle motor 2, and sends this detection signal to the RF amplifier 4. The detection signal includes a reproduction signal on the basis of a difference in the quantity of a reflected light of a laser beam from the target track at the reproduction, a focus error signal based on an astigmatism method, a tracking error signal based on a push-pull method, and address information based on a wobbling groove.

The RF amplifier 4 for example generates a RF signal from a sum signal of a four-way split photodetector of the optical pickup 1, which detects the reflected light from the optical disk 3. The RF signal is inputted to the signal processing part 21, and thereafter binarized and subjected to an EFM demodulation processing and the like. The optical disk type determination 22 in the signal processing part 21 determines the type of the optical disk, by employing the reflected light from the optical disk 3.

Further, the RF amplifier 4 generates a focus error (FE) signal and a tracking error (TE) signal from the reflected light from the optical disk 3. The FE signal is a signal which is obtained by detecting a deviation of focus of the laser emitted by the optical pickup 1 on the basis of the reflected light from the optical disk 3, and the TE signal is a signal which is obtained by detecting a deviation of track of the laser emitted by the optical pickup 1 on the basis of the reflected light from the optical disk 3.

These signals are inputted to the servo part 20, and the servo part 20 applies a driving signal to the driving circuit 11 to maintain focus and tracking states of an actuator included in the optical pickup 1 in the optimum states, thereby driving the actuator.

The serve part 20 includes the phase compensating circuit 5 for compensating the phase of the control system, and the composing circuit 6, and the gain adjusting circuit 10 for adjusting the gain.

At the loop gain adjustment, the microcomputer 9 applies disturbance via the D/A converter 7 to apply the same to the control system through the composing circuit 6, and a reply signal obtained from the applied disturbance which has made the circuit of the serve loop is inputted to the microcomputer 9 through the A/D converter 8.

The microcomputer 9 calculates a loop gain or a phase of the control system by arithmetic, on the basis of the above-mentioned disturbance signal and reply signal, and the loop gain is adjusted by the gain adjusting circuit 10.

Figure 2:
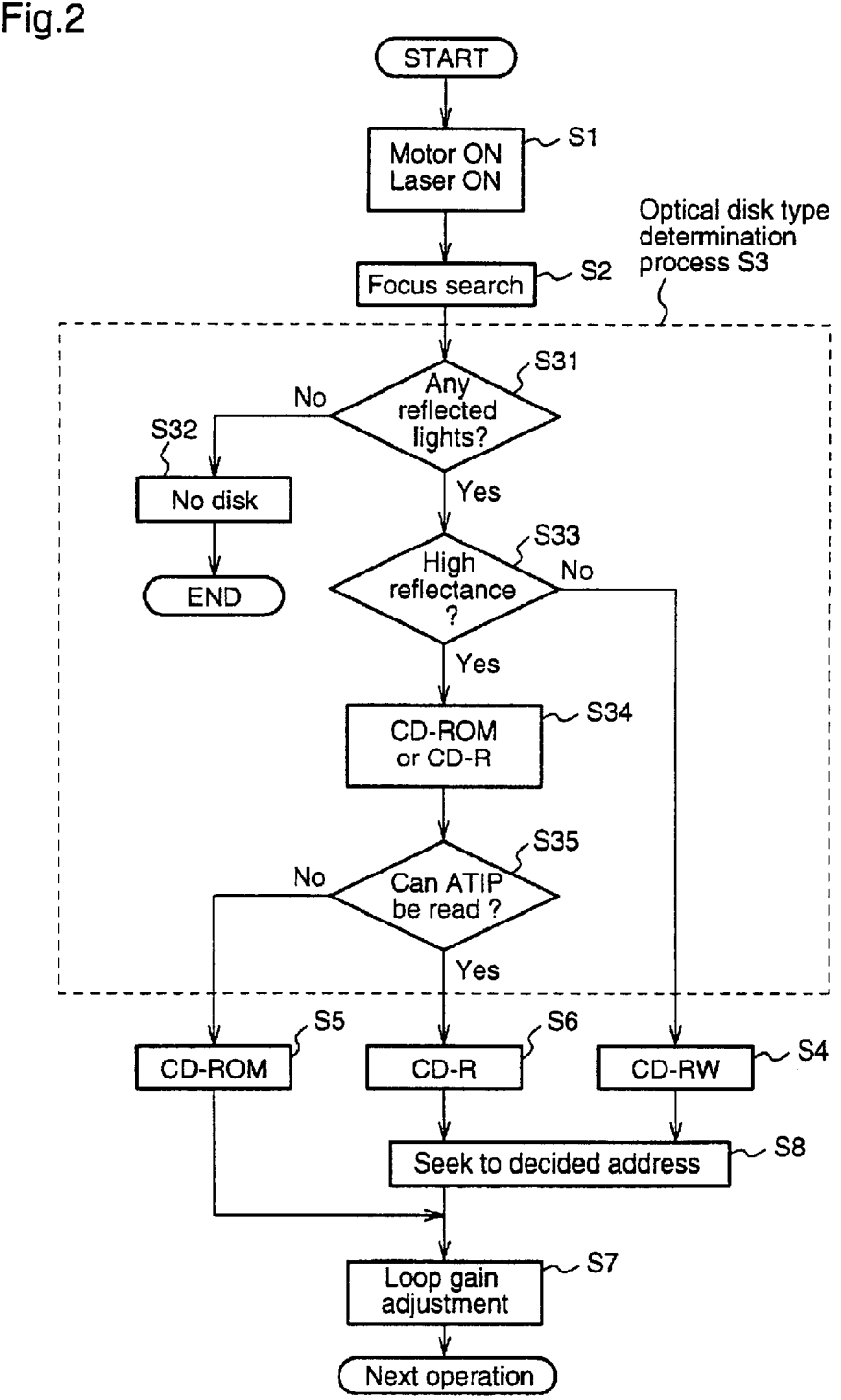
FIG. 2 is a flowchart for explaining a loop gain adjustment operation of the optical disk apparatus according to the first embodiment of the invention.

Next, the loop gain adjustment operation which is performed by the optical disk apparatus constructed as described above according to this embodiment will be described with reference to a flowchart in FIG. 2.

First, when the apparatus is started or a disk is inserted (mounted), the spindle motor is turned ON and the laser is turned ON (Step S1), thereby starting a spinup operation.

Next, a focus search operation is performed (Step S2) and an operation for determining the optical disk type is performed (Step S3).

A method for determining the optical disk type will be exemplified here.

First, whether there is a reflected light or not is judged from the presence or absence of a focus-error S-shaped signal at the focus search (step S31). When there is no reflected light at this time, it is judged that there is no optical disk (Step S32) and the spinup operation is ended.

When there is a reflected light and it is judged that there is an optical disk, a judgement according to the reflectance of the reflected light is made next (Step S33). The reflectance is generally 70% or more in the case of CD-ROM, 65% or more in the case of CD-R, and 15–25% in the case of CD-RW. Thus, when the reflectance is low the disk is judged to be a CD-RW (Step S4), while when the reflectance is high the disk is judged to be a CD-ROM or a CD-R.

Next, it is judged on the basis of the reproduction signal from the optical disk 3 whether ATIP (Absolute Time In Pre-groove) as time information which is modulated and added to wobbling groove can be read or not (Step S35), and when it cannot be read the disk is judged to be a CD-ROM (Step S5), while when it can be read the disk is judged to be a CD-R (Step s6).

The type of the optical disk is determined and, in the case of CD-ROM, the loop gain adjustment is performed (Step S7) and the operation proceeds to the next processing. When the disk is judged to be a CD-R or a CD-RW, the optical pickup is made seek a previously decided area (Step S8), then the loop gain adjustment is performed in that area after the seek, and the operation proceeds to the next operation.

A description will be given of an area where the loop gain adjustment is to be performed when the disk is judged to be a CD-R or a CD-RW as described above.

Figure 3:
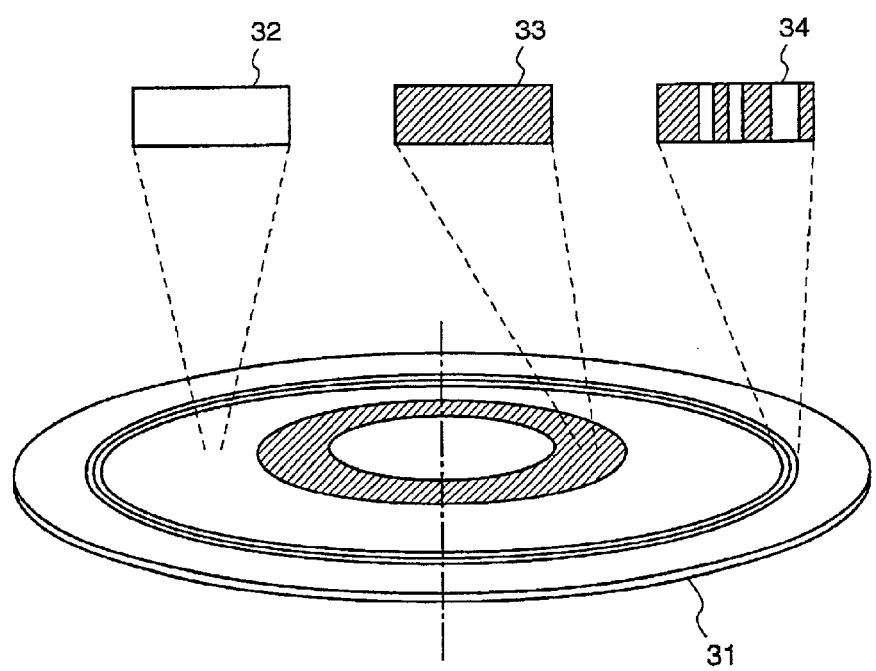
FIG. 3 is a diagram illustrating a state where prerecorded areas and recorded areas are mixed in a recordable optical disk.

FIG. 3 shows a state of the optical disk in which prerecorded areas and recorded areas exist.

In FIG. 3, numeral 31 denotes an optical disk. Numerals 32, 33 and 34 denote an area of the optical disk 31, respectively, which is shown in enlarged dimension; numeral 32 denotes an area where a prerecorded state has continuity, numeral 33 denotes an area where a recorded state has continuity, and numeral 34 denotes an area where prerecorded areas and recorded states are mixed with no continuity in the disk state.

When the loop gain adjustment is performed in an area such as the area 34 where prerecorded areas and recorded areas mixed, there is a possibility of movement to an area of a different disk state during the adjustment. When the disk state is changed, the quantity of a reflected light from the optical disk 31 is varied and an error signal amplitude of the servo system is varied, resulting in a possibility that the adjusting operation does not converge normally. Therefore, before the loop gain adjustment, the optical pickup is made seek an area where either a prerecorded or recorded disk state has continuity, such as the area 32 where the prerecorded state has continuity and the area 33 where the recorded state has continuity, and then the loop gain adjustment is performed.

However, it is necessary that the loop gain adjustment operation can be executed when any optical disk is inserted. Here, the loop gain adjustment operation in this embodiment, which can be executed for all recordable optical disks, will be described hereinafter.

Figure 4:
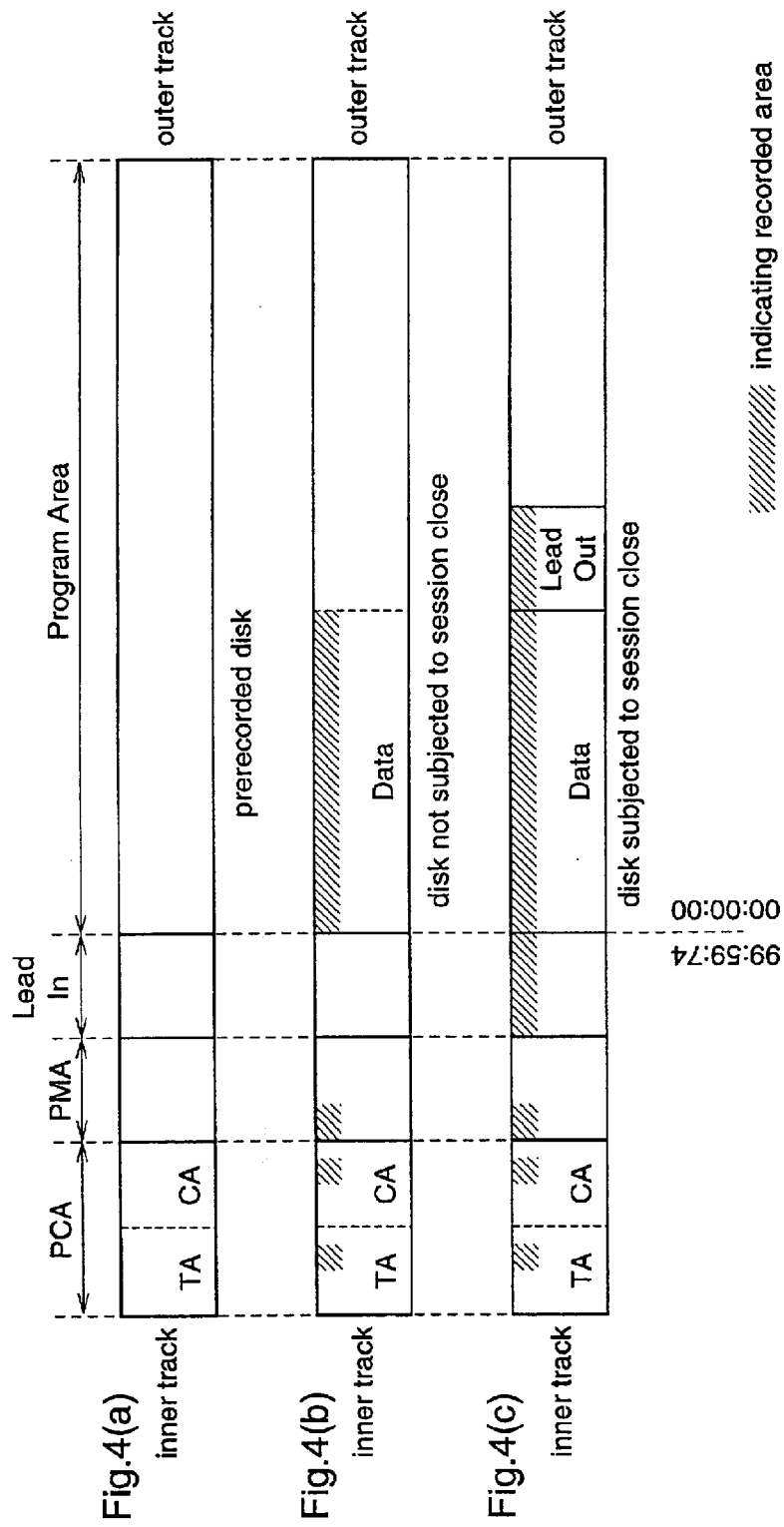
FIG. 4 are diagrams illustrating three kinds of disk state of a recordable optical disk.

FIG. 4 are cross sectional views illustrating information areas of a recordable optical disk in a case where the disk is completely prerecorded (FIG. 4(a)), a case where session close is not performed after recording (FIG. 4(b)), and a case where session close is performed (FIG. 4(c)).

The information area is constituted, from the inner tracks, by a PCA (Power Calibration Area) where initial setting of power emitted by a laser is performed, a PMA (Program Memory Area) where information of a start time and an end time of a recorded track is recorded, and a program area (Program Area). The PCA is further divided into two areas, a TA (Test Area) and a CA (Count Area).

Before the recording operation is started in the recordable optical disk, an OPC (Optimum Power Control) is performed in the TA of the PCA to obtain optimum recording power. At this time, in the CA, the number of times of OPC is counted up every time the OPC is performed. Then, when the recording operation is started and the recording to the program area is performed, information of the start time and the end time of the recorded track and the like is recorded in the PMA, and thereafter data is additionally written to the PMA every time data is additionally written to the track.

After the recording operation, when the session close is performed, lead-out data (Lead Out) and lead-in data (Lead In) are recorded on the optical disk. The Lead Out is additionally written on the side of outer tracks of an area which was recorded most recently, while the Lead In is recorded in a lead-in area between the PMA and the program area shown in FIG. 4 when the session is the first session. TOC (Table Of Contents) as the track information recorded in the PMA such as the start time and the end time of the track are repeatedly recorded in the lead-in area.

That is, regardless of whether a prerecorded disk or a recorded disk, the lead-in area of a disk which is not subjected to the session close is completely prerecorded while the lead-in area of a disk which has been subjected to the session close is in a completely recorded state. That is, there is no possibility that the prerecorded areas and the recorded areas are mixed in the lead-in area, and the continuity in the disk state is kept. Therefore, it is suitable to perform the loop gain adjustment in the lead-in area of the first session. While start addresses of the lead-in areas vary with makers and they are recorded in the ATIP information, the final address is fixed at 99:59:74.

In the seek operation at the loop gain adjustment in the optical disk apparatus according to the first embodiment, when the position of the optical pickup after the seek is at an end part of the lead-in area (for example, at 99:59:00) and the next area (for example, an area starting from 00:00:00) is an area different from the lead-in area, the optical pickup is made move to an intermediate part of the lead-in area (for example, an area in 99:30:00) at the seek before the loop gain adjustment.

As described above, in the first embodiment, the loop gain adjustment is performed in an arbitrary area, such as a lead-in area or a lead-out area, where the prerecorded or recorded disk state has continuity, whereby the optical disk apparatus can eliminate the possibility of movement to an area of a different disk state during the loop gain adjustment and can make the loop gain adjustment converge normally.

(Embodiment 2)

Next, an optical disk apparatus which is provided with an adjustment value storage means for storing a gain adjustment value in the optical disk apparatus according to the first embodiment will be described as a second embodiment with reference to figures.

Figure 5:
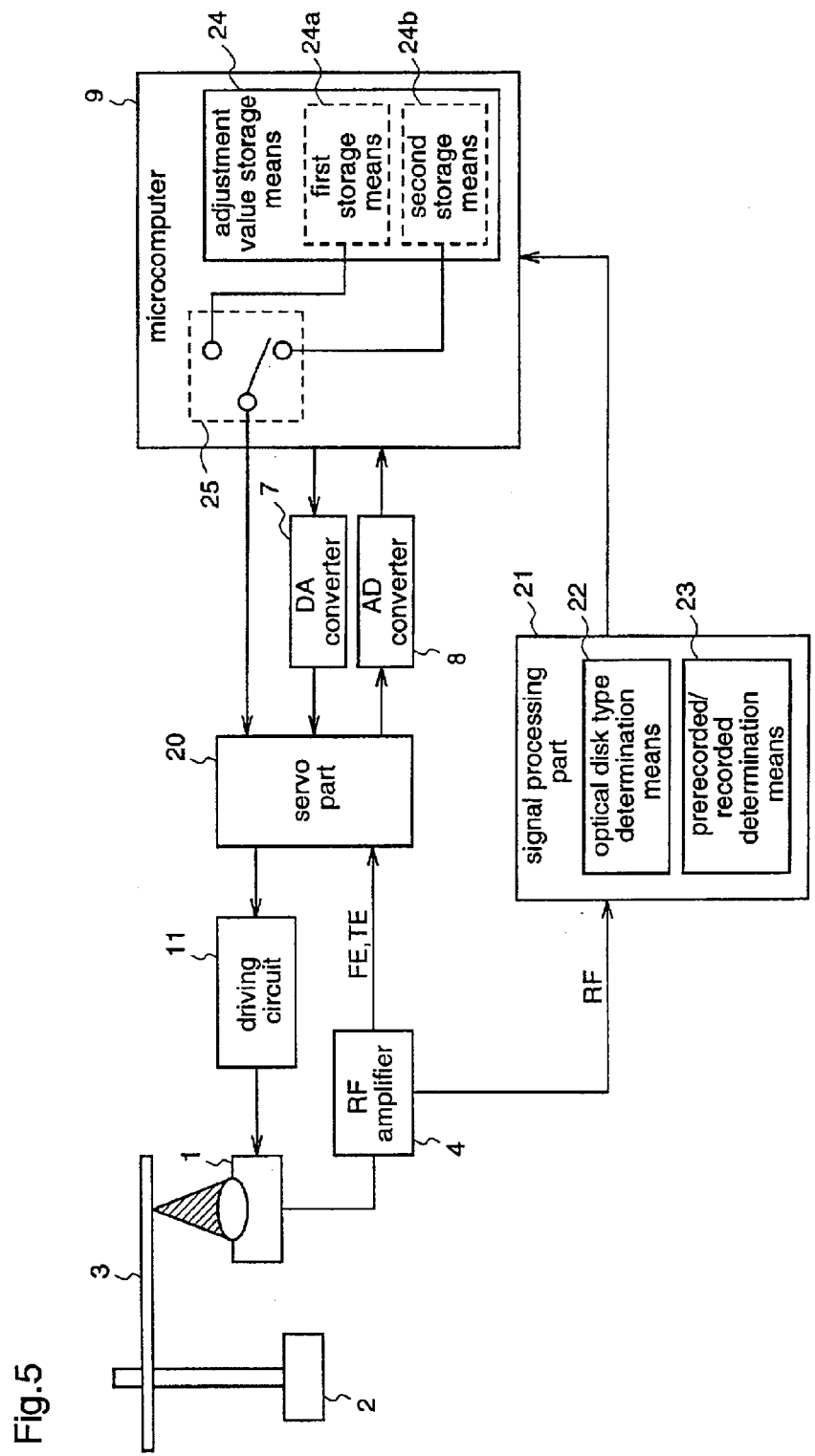
FIG. 5 is a block diagram illustrating a structure of an optical disk apparatus according to second and third embodiments of the present invention.

FIG. 5 is a block diagram illustrating the optical disk apparatus according the present invention. In FIG. 5, numeral 1 denotes an optical pickup, numeral 2 denotes a spindle motor, numeral 3 denotes an optical disk, numeral 4 denotes an RF amplifier, numeral 7 denotes a D/A converter, numeral 8 denotes an A/D converter, numeral 9 denotes a microcomputer, numeral 11 denotes a driving circuit, numeral 20 denotes a servo part, numeral 21 denotes a signal processing part having an optical disk type determination means 22 and a recorded/prerecorded determination means 23, numeral 24 denotes an adjustment value storage means having a first adjustment value storage means 24a and a second adjustment value storage means 24b, and numeral 25 denotes a switch.

Figure 6:
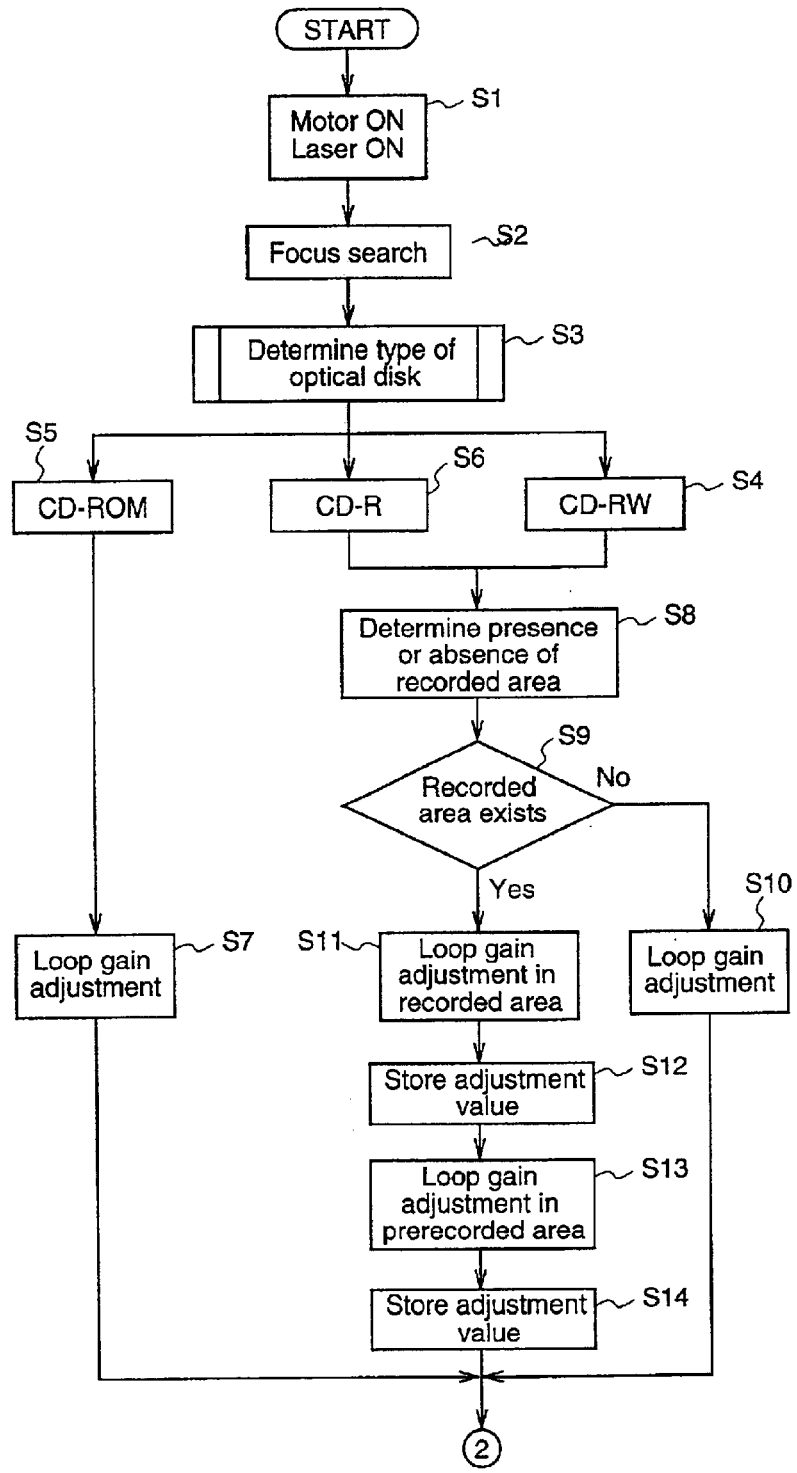
FIG. 6 is a flowchart for explaining a loop gain adjustment operation of the optical disk apparatus according to the second embodiment of the invention.
Figure 7:
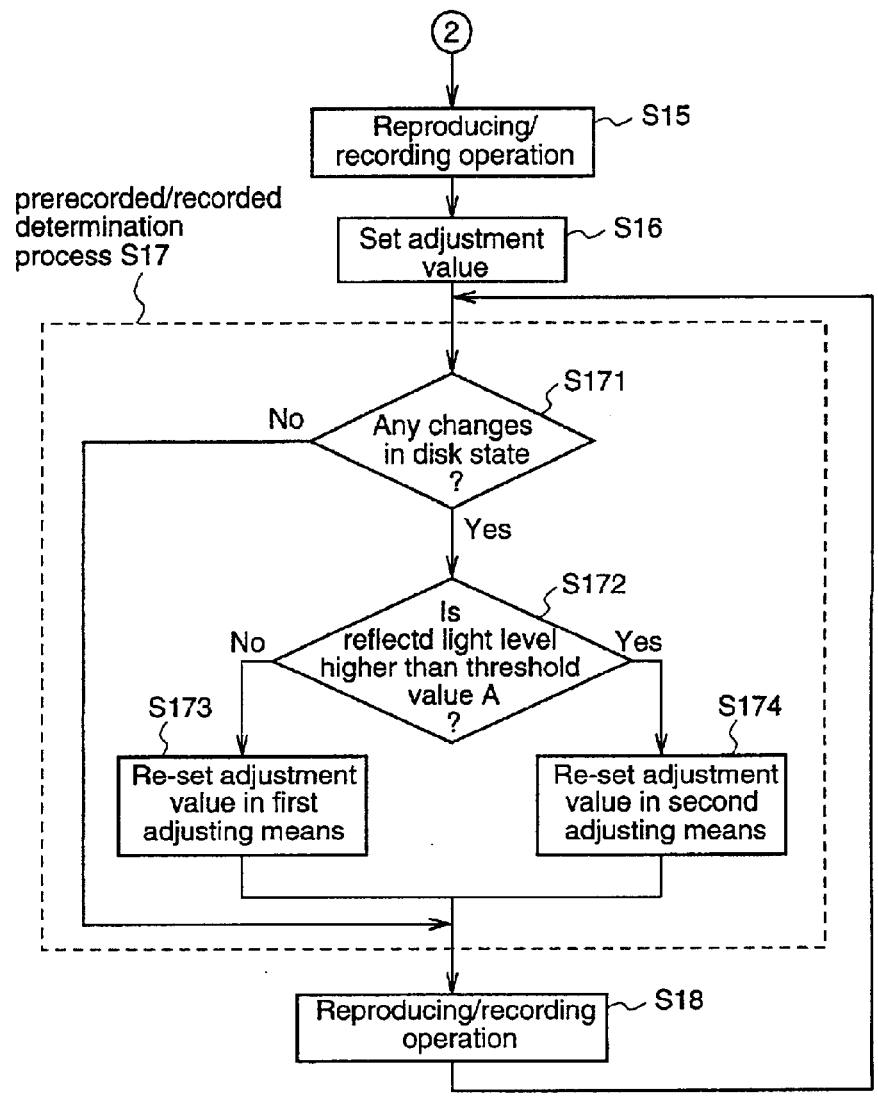
FIG. 7 is a flowchart showing a continuation of the flowchart shown in FIG. 6.

FIGS. 6 and 7 are flowcharts for explaining a loop gain adjustment operation performed by the optical disk apparatus according to the second embodiment.

Hereinafter, a loop gain adjustment method of the optical disk apparatus according to the second embodiment will be described with reference to these figures.

First, when the apparatus is started or a disk is inserted (mounted), the spindle motor is turned ON and the laser is turned ON (Step S1), thereby starting a spinup operation. Next, a focus search operation is performed (Step S2) and determination of the optical disk type is performed (step s3). Though it is assumed that this optical disk type determination method is the same as that described in the first embodiment, the method is not restricted to this.

When the optical disk inserted in the optical disk apparatus is determined to be a CD-ROM (Step S5), the loop gain adjustment operation is performed (Step S7) and then the operation proceeds to the next operation. When the optical disk inserted in the optical disk apparatus is determined to be a CD-R or a CD-RW (Step S6 or 54), it is determined whether a recorded area exists in the optical disk or not, by the recorded/prerecorded determination means 23 in the signal processing part 21 (step S8).

While the method for determining whether there is a recorded area or not of the optical disk apparatus according to the embodiment will be described here, this method is illustrative and the present invention is not restricted to this.

Figure 8:
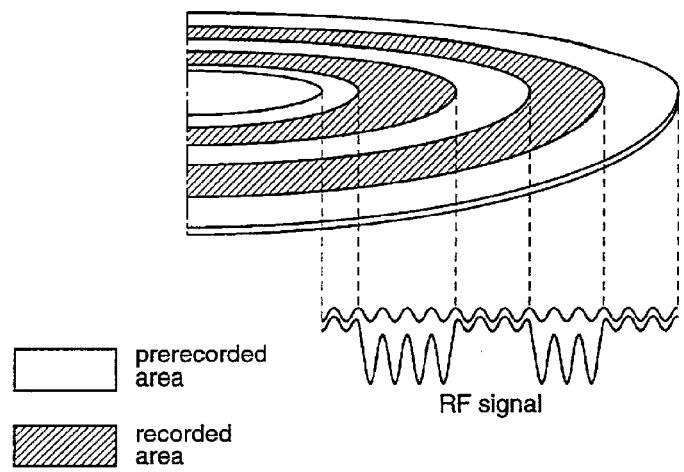
FIG. 8 is a diagram illustrating changes in a RF signal in prerecorded areas and recorded areas in a recordable optical disk.

In the optical disk apparatus according to the embodiment, after the type of the optical disk is determined, a tracking servo is turned OFF and only a focus servo is turned ON. In this state, the optical pickup is made seek for example from the innermost track to the outermost track of the optical disk, to observe a RF signal. At this time, when no recorded area is included in the optical disk the RF signal is constant, while when the disk is one in which prerecorded areas and recorded areas exist as shown in FIG. 8 the level of the signal is decreased because the quantity of the reflected light is reduced in the recorded area as compared to the prerecorded area.

Figure 9:
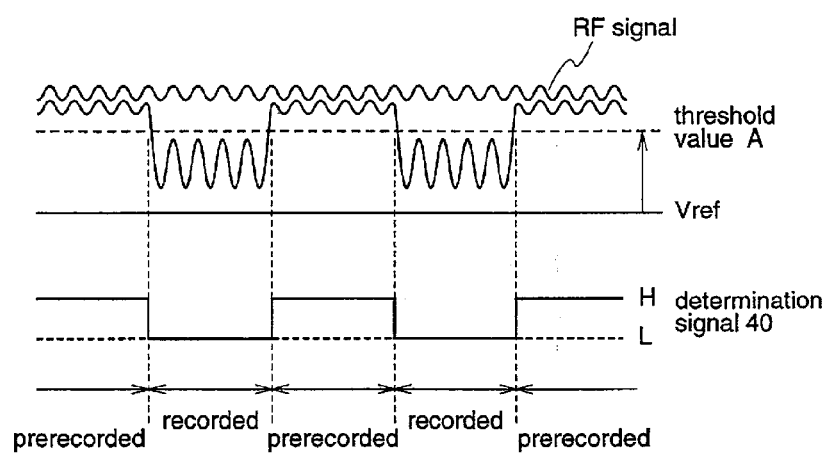
FIG. 9 is a diagram showing a method for determining whether it is prerecorded or recorded by the optical disk apparatus according to the second embodiment of the invention.

Thus, when a preset threshold value A is set on the basis of a reference voltage Vref as shown in FIG. 9, it can be determined that the area is a prerecorded area when the signal level is larger than A, while it can be determined that the area is a recorded area when the signal level is equal to or smaller than A.

At this time, the signal level is binarized on the basis of the threshold value A, thereby setting a determination signal 40, which is High in prerecorded areas and Low in recorded areas, as shown in FIG. 9.

When the above-mentioned determination of the presence or absence of recorded areas in the optical disk is ended (Step S9) and it is determined that no recorded area is included, the loop gain adjustment operation is performed (Step S10) and the operation proceeds to the next operation. When it is determined that any recorded area exists, the optical pickup is made seek the recorded area, thereby performing the loop gain adjustment.

When the loop gain adjustment is performed in the recorded area (Step S11), the adjustment value is stored in the first adjustment value storage means 24a provided in the adjustment value storage means 24 which is constituted by a memory such as an RAM (Random Access Memory) in the microcomputer 9 (Step S12).

When the loop gain adjustment in the recorded area is completed, then the optical pickup is made seek a prerecorded area, thereby performing the loop gain adjustment (Step S13).

When the loop gain adjustment is performed in the prerecorded area, the adjustment value is stored in the second adjustment value storage means 24b provided in the adjustment value storage means 24 (Step S14).

When the loop gain adjustment and other adjusting operations are completed, the operation proceeds to a reproducing or recording operation (Step S15).

When the optical disk inserted in the optical disk apparatus according to this embodiment is a recordable optical disk, the optical disk apparatus changes over the switch 25 according to the state of the area where the optical pickup operates, i.e., whether the area is prerecorded or recorded, and reads the first or second adjustment value. Then, the read value is set in the gain adjusting circuit in the servo part 20, thereby starting the operation (Step S16).

The prerecorded/recorded determination means 23 constantly monitors the disk state while the optical disk apparatus is operating (Step S17) and, when the disk state is changed and the determination signal 40 is varied, notifies the microcomputer 9 that the disk state has been changed (Step S171).

When the microcomputer 9 receives the notification of the change in the disk state (step S172), the microcomputer 9 changes over the switch 25 in accordance with the determination signal 40 and re-sets the adjustment value in the gain adjusting circuit (Steps S173 and S174). When the operation of re-setting the gain adjustment value is completed, the operation proceeds to the reproducing or recording operation (step S18).

The method by which it is determined whether an area is prerecorded or recorded during the operation may be carried out on the basis of changes in a reflected light from the optical disk, for example as the method by which it is determined whether any recorded area is included or not.

As described above, in this embodiment, when the optical disk to be operated is a recordable optical disk and includes recorded areas, the loop gain adjustment is performed in both of prerecorded areas and recorded areas in the optical disk. Therefore, even when the states of the servo system in the prerecorded area and the recorded area are significantly different from each other due to changes in the disk state, the influences can be eliminated by changing over adjustment values, resulting in an optical disk apparatus which always has a stable servo system.

(Embodiment 3)

Next, an optical disk apparatus which is constructed so as to perform the loop gain adjustment by employing a PMA (Program Memory Area), in the optical disk apparatus according to the second embodiment will be described as a third embodiment with reference to figures.

A block diagram illustrating a structure of the optical disk apparatus according to this embodiment is the same as that in FIG. 5 which is employed for the description of the optical disk apparatus according to the second embodiment, and thus its description will be omitted here.

Figure 10:
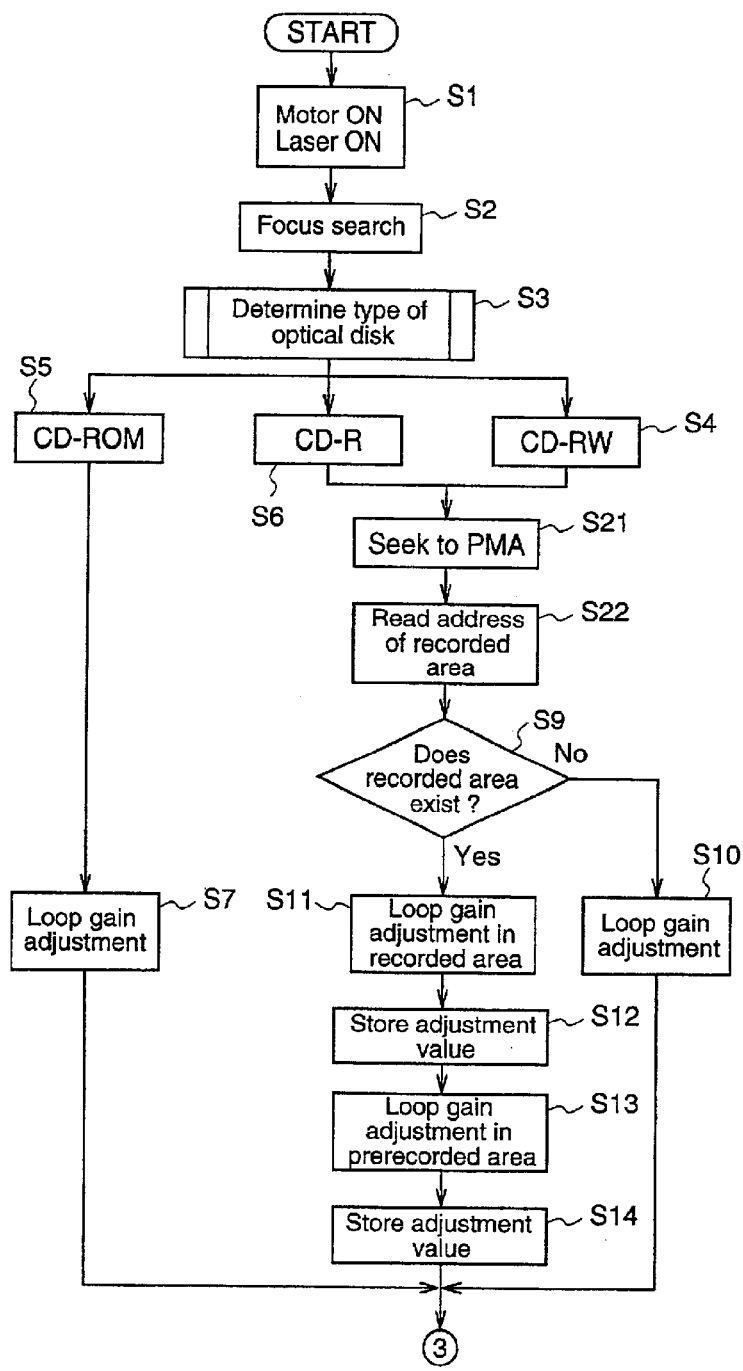
FIG. 10 is a flowchart for explaining a loop gain adjustment operation of the optical disk apparatus according to third embodiment of the invention.
Figure 11:
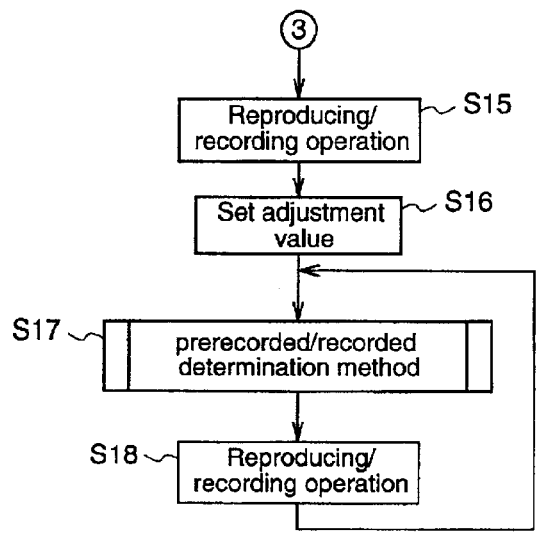
FIG. 11 is a flowchart showing a continuation of the flowchart shown in FIG. 10.

The loop gain adjustment operation of the optical disk apparatus according to the third embodiment will be described with reference to flowcharts in FIGS. 10 and 11.

First, when the apparatus is started or an optical disk is inserted (mounted), the spindle motor is turned ON and the laser is turned ON (Step S1), thereby starting a spinup operation.

Next, a focus search operation is performed (Step S2) and determination of the optical disk type is performed (Step S3). This optical disk type determination method is the same as that described in the first embodiment, while any methods other than this can be carried out.

When the inserted optical disk is determined to be a CD-ROM (Step S5), the loop gain adjustment operation is performed and then the operation proceeds to the next operation.

When the type of the optical disk is determined to be a CD-R or a CD-RW by the determination of the optical disk type (Step S6 or 54), the optical pickup is made seek the PMA (Step S21).

Figure 12:
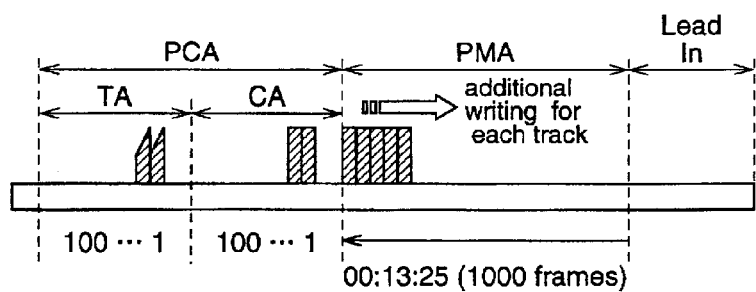
FIG. 12 is a diagram illustrating an additional writing operation for a PMA after the recording operation in the recordable optical disk.

Here, the PMA will be briefly described. As shown in FIG. 12, the PMA is an area starting at an inner track which is 00:13:25, that is 1000 frames, inward from the start time of a Lead-In area, and in which information of start times and end times of tracks recorded in a program area is recorded. Since additional writing to the PMA is performed every time data is additionally written in a track, a recorded area in the program area can be retrieved by reading an address in the PMA (Step s22).

When the address information cannot be read from the PMA by this method (Step S9), it is judged that the optical disk is a completely prerecorded disk, then the loop gain adjustment is performed (step S10), and thereafter the operation proceeds to the next operation. When the address information can be read from the PMA, it is judged that the optical disk is a disk having any recorded area, the optical pickup is made seek the recorded area, thereby performing the loop gain adjustment (Step S11).

When the loop gain adjustment is performed in the recorded area, the adjustment value is stored in an area as the first adjustment value storage means which is included in the adjustment value storage means 24 in the microcomputer 9 as a first adjustment value (Step S12).

When the loop gain adjustment in the recorded area is completed, then the optical pickup is made seek a prerecorded area, thereby performing the loop gain adjustment (Step S13). When the loop gain adjustment is performed in the prerecorded area, the adjustment value is stored in an area as the second adjustment value storage means included in the adjustment value storage means 24 as a second adjustment value (Step S14).

When the loop gain adjustment and other adjusting operations are completed, the operation proceeds to a reproducing or recording operation (Step S15).

When the inserted optical disk is a recordable optical disk, the optical disk apparatus according to this embodiment changes over the switch 25 according to the disk states, i.e., whether the operation area is prerecorded or recorded, and reads the first adjustment value or the second adjustment value from the adjustment value storage means 24. Then, the value is set in the gain adjusting circuit in the servo part 20, thereby starting the operation (Step 516).

While the optical disk apparatus is operating, the prerecorded/recorded determination means 23 constantly monitors the disk state (Step S17) and, when the disk state is changed and the determination signal 40 is varied, notifies the microcomputer 9 that the disk state has been changed.

When the microcomputer 9 receives the notification of changes in the disk state from the prerecorded/recorded determination means 23, it changes over the switch 25 in accordance with the determination signal 40 and re-sets the adjustment value in the gain adjusting circuit. When the operation of re-setting the gain adjustment value is completed, the operation proceeds to the reproducing or recording operation (step S18).

The method for determining whether an area is prerecorded or recorded during the operation is carried out here on the basis of changes in a reflected light from the optical disk as the above-mentioned method by which the presence or absence of the recorded area is determined, but it is not restricted to this.

As described above, in this embodiment, the loop gain adjustment is performed in both of the prerecorded area and the recorded area. Therefore, even when the states of the servo system in the prerecorded area and the recorded area are made greatly different from each other due to changes in the disk state, the influence can be eliminated by changing over the adjustment value. Besides, when the optical disk is a recordable optical disk at the start of the optical disk apparatus or insertion of the optical disk, the presence or absence of recorded areas can be determined from the PMA, whereby the optical disk apparatus can easily determine the presence of absence of recorded areas.

(Embodiment 4)

Next, an optical disk apparatus which is provided with a correction value storage means and an arithmetic means in the microcomputer in the optical disk apparatus described in the second or third embodiment will be described as a fourth embodiment with reference to figures.

Figure 13:
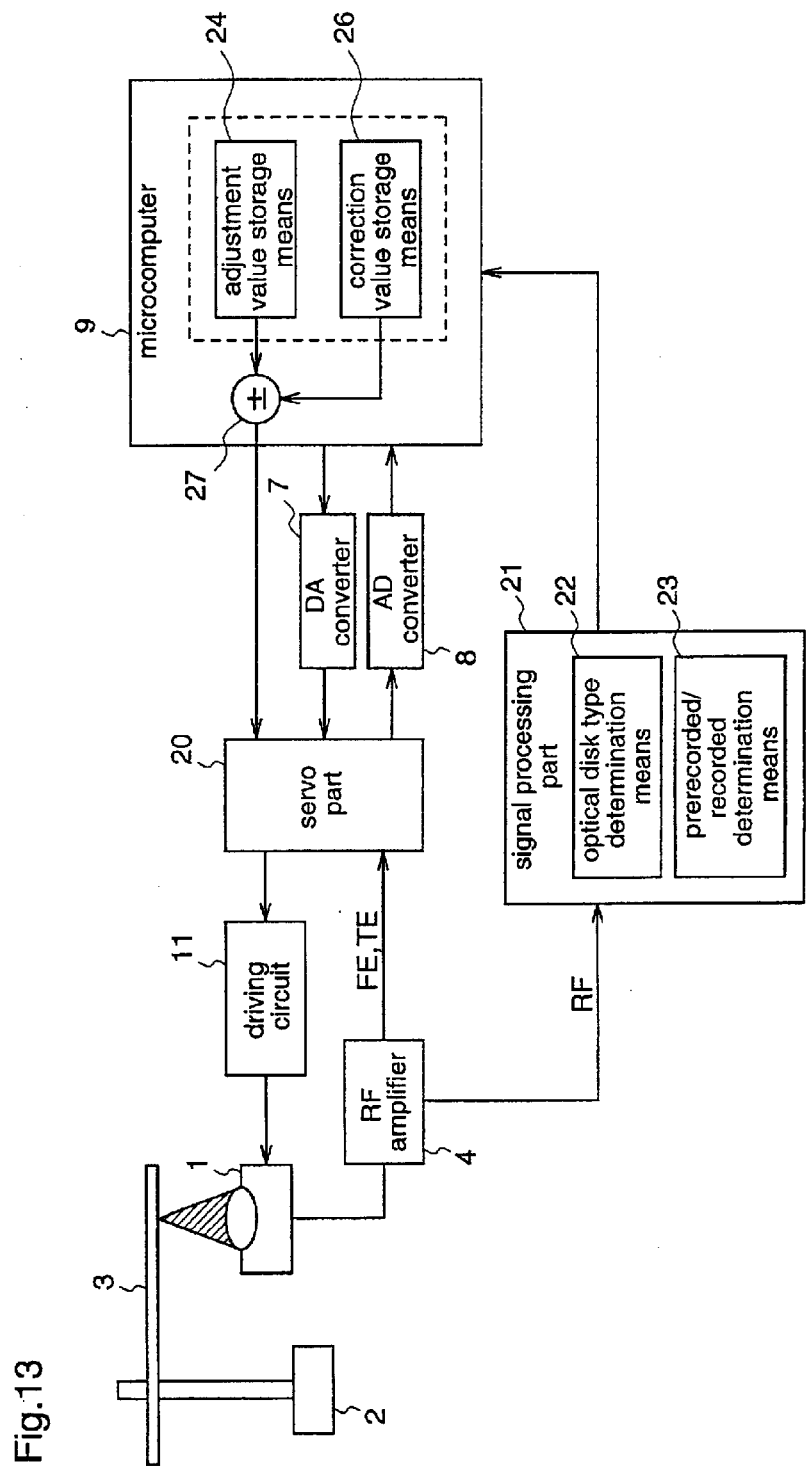
FIG. 13 is a block diagram illustrating a structure of an optical disk apparatus according to a fourth embodiment of the present invention.

FIG. 13 is a block diagram illustrating the optical disk apparatus according the embodiment. In FIG. 13, numeral 1 denotes an optical pickup, numeral 2 denotes a spindle motor, numeral 3 denotes an optical disk, numeral 4 denotes an RF amplifier, numeral 7 denotes a D/A converter, numeral 8 denotes an A/D converter, numeral 9 denotes a microcomputer, numeral 11 denotes a driving circuit, numeral 20 denotes a servo part, numeral 21 denotes a signal processing part having an optical disk type determination means 22 and a recorded/prerecorded determination means 23, numeral 24 denotes an adjustment value storage means, numeral 26 denotes a correction value storage means, and numeral 27 denotes an arithmetic means.

Figure 14:
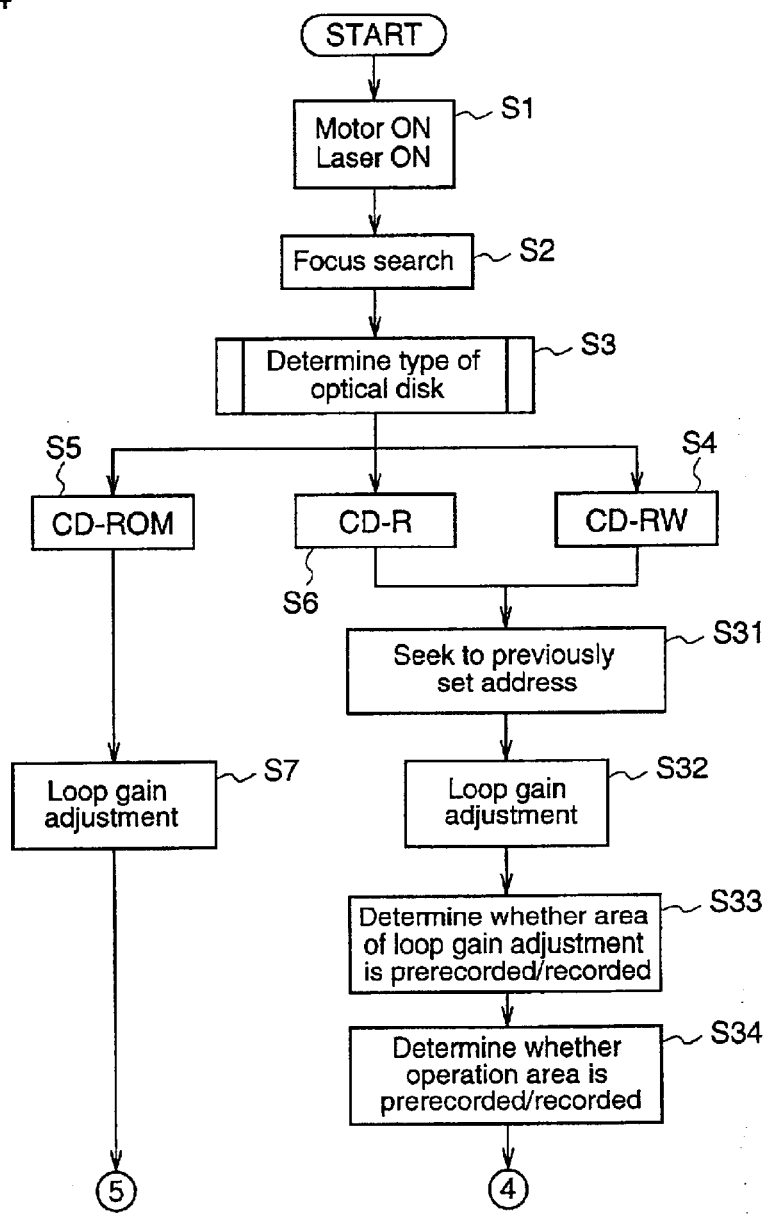
FIG. 14 is a flowchart for explaining a loop gain adjustment operation of the optical disk apparatus according to the fourth embodiment of the invention.
Figure 15:
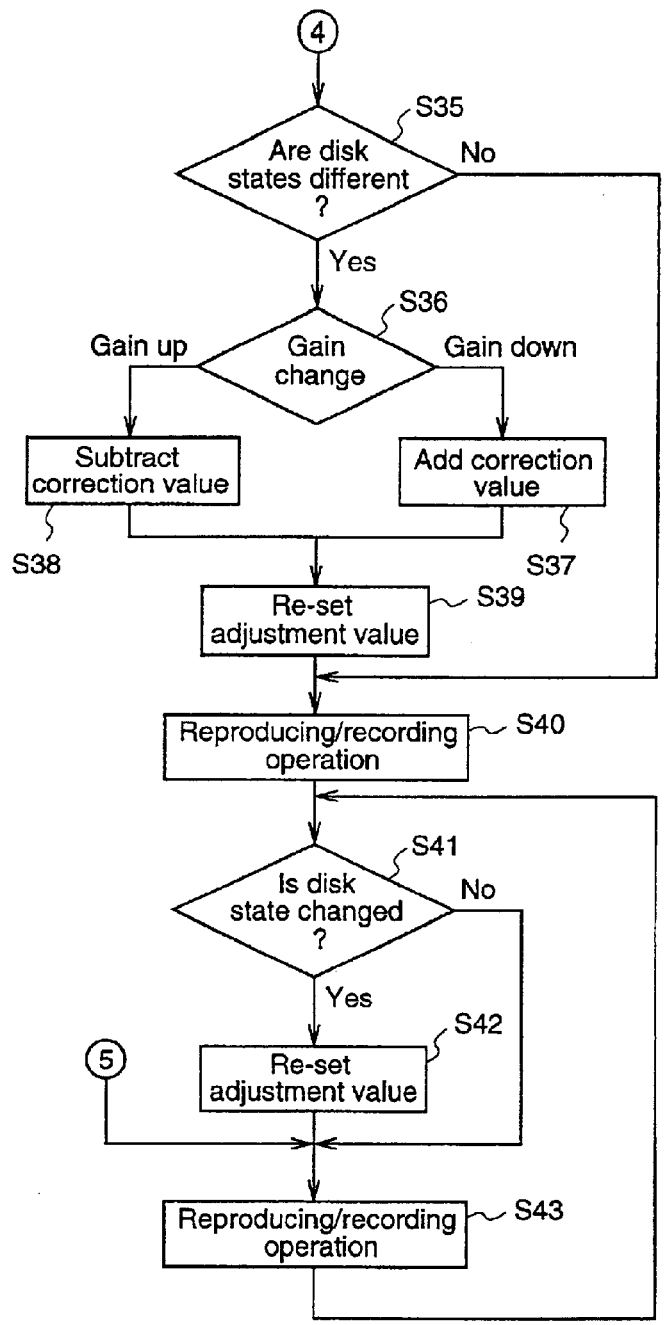
FIG. 15 is a flowchart showing a continuation of the flowchart shown in FIG. 14.

FIGS. 14 and 15 are flowcharts for explaining the loop gain adjustment operation performed by the optical disk apparatus according to this embodiment.

Hereinafter, the operation of the optical disk apparatus according to this embodiment will be described with reference to these figures.

First, when the optical disk apparatus is started or a disk is inserted, the spindle motor is turned ON and the laser is turned ON (Step S1), thereby starting a spinup operation.

Next, a focus search operation is performed (Step S2) and then determination of the optical disk type is performed (Step S3). Here, it is assumed that the optical disk type determination method is the same as that described in the first embodiment, but it is not restricted thereto.

When the inserted optical disk is determined to be a CD-ROM (Step S5), the loop gain adjustment operation is performed (Step S7) and the operation proceed to a reproducing operation (Step S43). When the optical disk is determined to be a CD-R or a CD-RW by the optical disk type determination (Step S6 or S4), the optical pickup 1 is made seek a previously set area (Step S31), thereby performing the loop gain adjustment (Step S32). Here, the previously set area at the loop gain adjustment is assumed a lead-in area described in the first embodiment.

When the loop gain adjustment is performed, an adjustment value is stored in the adjustment value storage means 24 included in a memory means such as a RAM in the microcomputer 9.

At this time, the optical disk apparatus determines whether the area where the loop gain adjustment has been performed is prerecorded or recorded (Step S33). It is assumed that the area determination method is the same as that described in the second embodiment.

After the determination operation, the optical pickup 1 is made perform seeking, then the disk state in an area where a reproducing/recording operation is to be performed is monitored, and it is determined whether the area is prerecorded or recorded (Step S34). Also in this case, it is assumed that the determination of the disk state is performed in the same manner as in the determination method at the loop gain adjustment.

As the result of carrying out the operation area determination method, when it is determined by the prerecorded/recorded determination means 23 that the area where the reproducing/recording operation is performed has a different disk state from that of the area where the loop gain 9 adjustment has been performed (Step S35), the prerecorded/recorded determination means 23 notifies the microcomputer 9 that the disk state is changed.

When the microcomputer 9 receives the notification telling that the optical disk state is changed (Step S36), it outputs a gain correction value stored in the correction value storage means 26 included in a memory means such as an RAM which constitutes the microcomputer 9, and adds/subtracts the gain correction value to/from the adjustment value obtained in the loop gain adjustment by the arithmetic means 27 (Step S37 or S38).

In the correction value storage means 26, a positive gain correction value is previously set. The gain correction value is set at 3[dB] here. When the loop gain is in a decreasing state when the optical disk apparatus starts its operation, that is, when the disk state at the loop gain adjustment is in a prerecorded area and is in a recorded area at the operation, the arithmetic means 27 adds the correction value to the adjustment value, so that the loop gain is increased by 3[dB] (Step S39).

On the contrary, when the loop gain is in an increasing state, that is, when the disk state at the loop gain adjustment is in a recorded area and is in a prerecorded area at the operation, the arithmetic means 27 subtracts the correction value from the adjustment value, so that the loop gain is decreased by 3[dB] (Step S39).

The adjustment value set by the arithmetic is set in the gain adjusting circuit in the servo part 20, thereby starting the operation (Step S40).

The prerecorded/recorded determination means 23 constantly monitors the disk state while the optical disk apparatus is operating and, when the disk state is changed and the determination signal 40 is varied (step S41), notifies the microcomputer 9 that the disk state has been changed.

When the microcomputer 9 receives the notification of the change in the disk state from the prerecorded/recorded determination means 23, it changes over the arithmetic means 27 in accordance with the determination signal 40 in the prerecorded/recorded determination means 23 to perform the arithmetic again and re-set the adjustment value in the gain adjusting circuit (Step S42), and thereafter resumes the operation (Step S43).

As described above, the optical disk apparatus according to the fourth embodiment previously sets the gain correction value. Therefore, it is unnecessary to perform the loop gain adjustment in both of the prerecorded area and the recorded area, and even when the states of the servo system in the prerecorded area and the recorded area are made greatly different from each other due to changes in the disk state the influences can be reduced by changing over the gain correction value, resulting in an optical disk apparatus which always has a stable servo system.

(Embodiment 5)

Next, an optical disk apparatus which is provided with plural correction value storage means in the optical disk apparatus according to the fourth embodiment will be described as a fifth embodiment with reference to figures.

Figure 16:
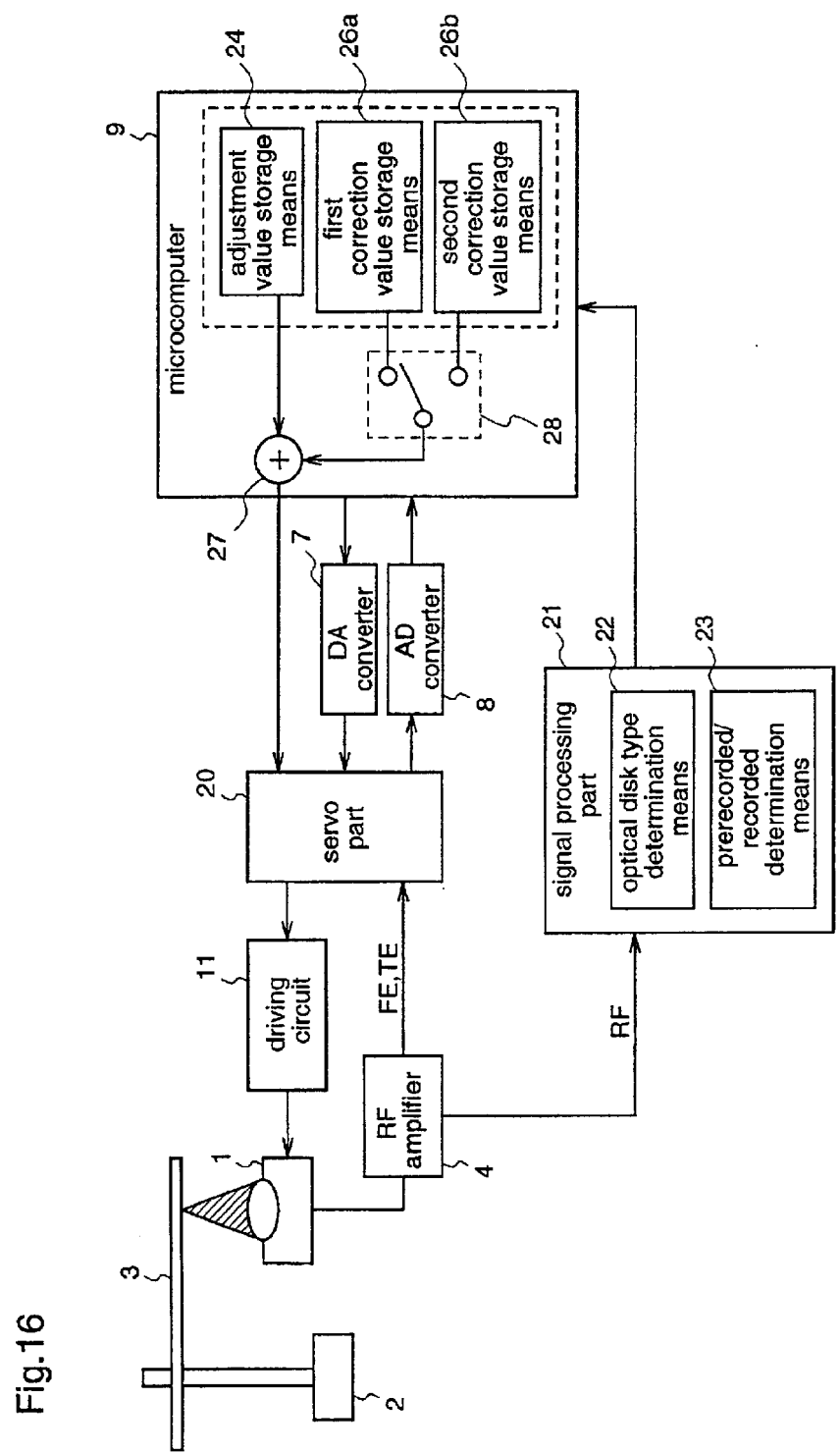
FIG. 16 is a block diagram illustrating a structure of an optical disk apparatus according to a fifth embodiment of the present invention.

FIG. 16 is a block diagram illustrating the optical disk apparatus according this embodiment.

In FIG. 16, numeral 1 denotes an optical pickup, numeral 2 denotes a spindle motor, numeral 3 denotes an optical disk, numeral 4 denotes an RF amplifier, numeral 7 denotes a D/A converter, numeral 8 denotes an A/D converter, numeral 9 denotes a microcomputer, numeral 11 denotes a driving circuit, numeral 20 denotes a servo part, numeral 21 denotes a signal processing part having an optical disk type determination means 22 and a recorded/prerecorded determination means 23, numeral 24 denotes an adjustment value storage means, numeral 26a denotes a first correction value storage means, numeral 26b denotes a second correction value storage means, numeral 27 denotes an arithmetic means, and numeral 28 denotes a switch.

Figure 17:
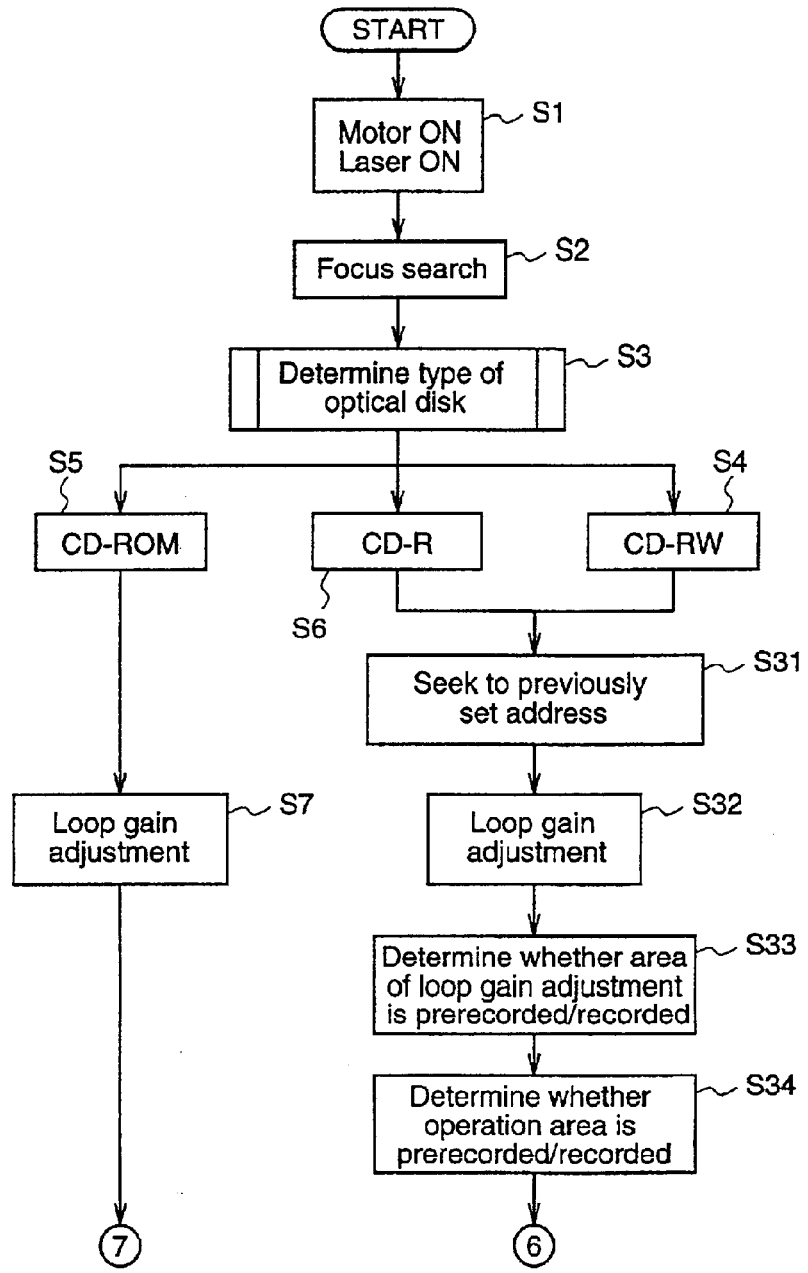
FIG. 17 is a flowchart for explaining a loop gain adjustment operation of the optical disk apparatus according to the fifth embodiment of the invention.
Figure 18:
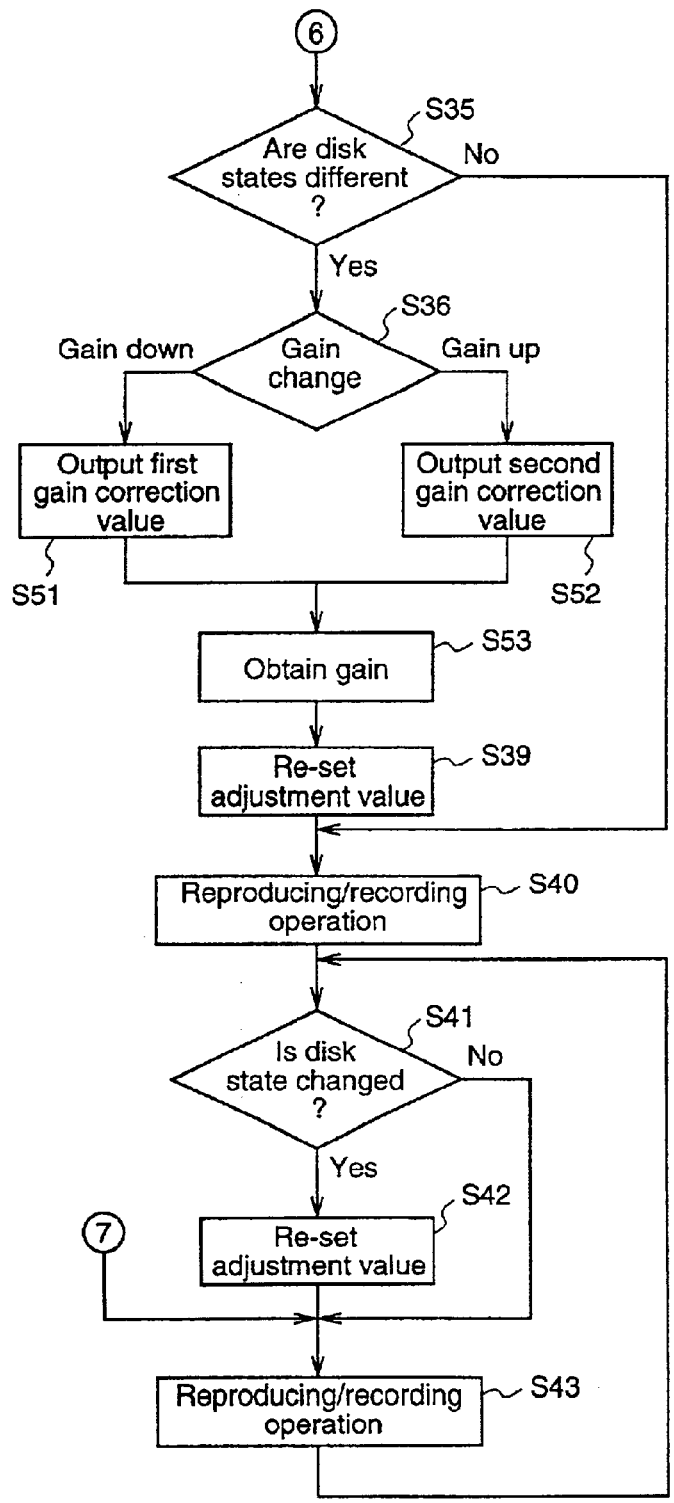
FIG. 18 is a flowchart showing a continuation of the flowchart shown in FIG. 17.

Hereinafter, an operation at loop gain adjustment of the optical disk apparatus constituted as described above according to this embodiment will be described with reference to flowcharts in FIGS. 17 and 18.

First, when the optical disk apparatus is started or a disk is inserted (mounted), the spindle motor is turned ON and the laser is turned ON (Step S1), thereby starting a spinup operation.

Next, a focus search operation is performed (Step S2) and determination of the optical disk type is performed (Step S3). It is assumed here that the optical disk type determination method here is the same as that described in the first embodiment.

When the inserted optical disk is determined to be a CD-ROM (Step S5), the loop gain adjustment operation is performed (Step S7) and then the operation proceeds to a reproducing operation (Step S43). When the optical disk is determined to be a CD-R or a CD-RW (Step S6 or S4), the optical pickup is made seek a previously set area (Step S31), and then the loop gain adjustment is performed (Step S32).

When the loop gain adjustment is performed, the adjustment value is stored in the adjustment value storage means included in a memory means such as a RAM in the microcomputer 9. The previously set area at the loop gain adjustment here is assumed a lead-in area described in the first embodiment.

At this time, the optical disk apparatus determines whether the area where the loop gain adjustment has been performed is prerecorded or recorded (Step S33). A method for determining the area is the same as that described in the second embodiment, which employs a reflected light from the optical disk.

After the determination operation, the optical pickup 1 is made perform seeking, the disk state of an area where a reproducing/recording operation is performed is monitored, and it is determined whether the area is prerecorded or recorded (step S34). Also in this case, the determination of the disk state is performed for example in the same manner as the determination method at the loop gain adjustment.

As the result of carrying out the operation area determination method, when it is determined in the prerecorded/recorded determination means 23 that the disk states are different between the area where the reproducing/recording operation is performed and the area where the loop gain adjustment has been performed (Step S35), the prerecorded/recorded determination means 23 notifies the microcomputer 9 that the disk state is changed.

From this notification, when the loop gain is in a decreasing state when the optical disk apparatus starts its operation, that is, when the disk state at the loop gain adjustment is in a prerecorded area and an area at the operation is a recorded area (Step S36), the switch 28 selects the first correction value storage means 26a (Step S51) and the arithmetic means 27 adds a gain adjustment value in the adjustment value storage means 24 which is obtained by the loop gain adjustment and the first gain correction value (Step S53). On the contrary, when the loop gain is in an increasing state, that is, when the disk state at the loop gain adjustment is in a recorded area and is an area at the operation is an prerecorded area (Step S36), the switch 28 selects the second correction value storage means 26b (Step S52) and the arithmetic means 27 adds a gain adjustment value in the adjustment value storage means 24 and the second gain correction value (Step S53). Here, plural positive gain correction values such as 2[dB] are set in the first correction value storage means 26a, and plural negative gain correction values such as –3[dB] are set in the second correction value storage means 26b, respectively.

Depending on characteristics of the optical disk apparatus or characteristics of respective makers disks, absolute values of changes in the gain may be different in the cases where the gain is increasing and the gain is decreasing. Therefore, the optical disk apparatus according to this embodiment can set gain correction values of different absolute values, with previously considering of those as described above. It is of course possible to set gain correction values of the same absolute values and to perform the same gain correction as that in the fourth embodiment.

When the gain correction process is performed, the adjustment value which is newly obtained by the arithmetic means 27 is re-set in the gain adjusting circuit in the servo control part 20 (Step S39), and then the operation is started 2 (Step S40). The prerecorded/recorded determination means 23 constantly monitors the disk state while the optical disk apparatus is operating and, when the disk state is changed and the determination signal 40 is varied, notifies the microcomputer 9 that the disk state is changed.

When the microcomputer 9 receives the notification of change in the disk state from the prerecorded/recorded determination means 23 (Step S41), it changes over the switch 28 in accordance with the determination signal 40 in the prerecorded/recorded means 23 to perform arithmetic again in the arithmetic means 27, re-sets an adjustment value in the gain adjusting circuit (step S42), and thereafter the operation is resumed (Step S43).

As described above, in this embodiment, the gain correction value is previously set. Therefore, it is unnecessary to perform the loop gain adjustment both in the prerecorded area and the recorded area, whereby an optical disk apparatus which always has a stable servo system can be obtained in which even when the states of the servo system in the prerecorded area and the recorded area are made greatly different from each other due to changes in the disk state, the influence can be reduced by changing over the gain correction value.

(Embodiment 6)

Next, an optical disk apparatus which is provided with three adjustment value storage means and an arithmetic means in the microcomputer in the optical disk apparatus according to the fifth embodiment will be described as a sixth embodiment with reference to figures.

Figure 19:
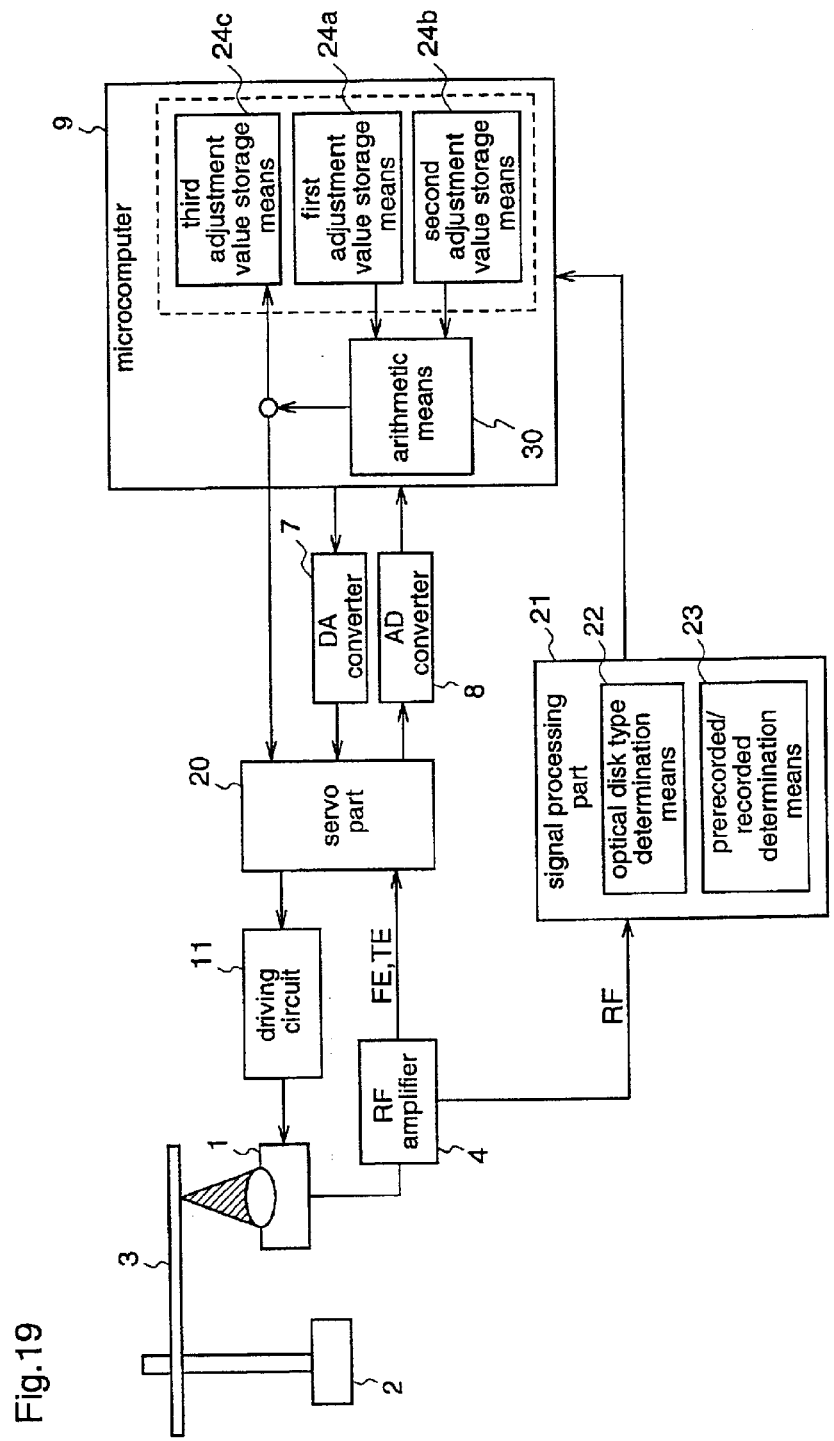
FIG. 19 is a block diagram illustrating a structure of an optical disk apparatus according to a sixth embodiment of the present invention.

FIG. 19 is a block diagram illustrating the optical disk apparatus according this embodiment.

In FIG. 19, numeral 1 denotes an optical pickup, numeral 2 denotes a spindle motor, numeral 3 denotes an optical disk, numeral 4 denotes an RF amplifier, numeral 7 denotes a D/A converter, numeral 8 denotes an A/D converter, numeral 9 denotes a microcomputer, numeral 11 denotes a driving circuit, numeral 20 denotes a servo part, numeral 21 denotes a signal processing part having an optical disk type determination means 22 and a recorded/prerecorded determination means 23, numeral 24a denotes a first adjustment value storage means, numeral 24b denotes a second adjustment value storage means, numeral 24c denotes a third adjustment value storage means, and numeral 30 denotes an arithmetic means.

Figure 20:
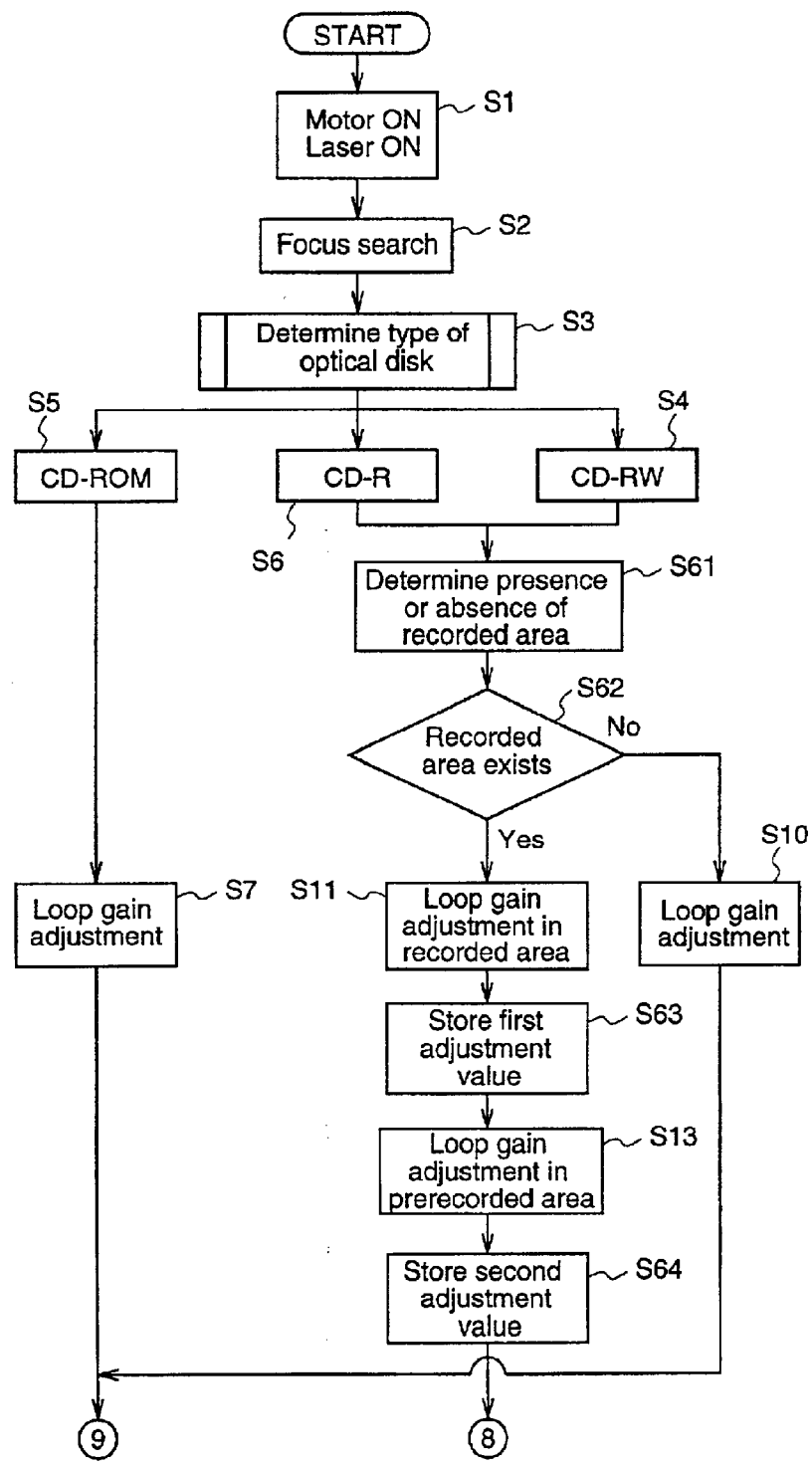
FIG. 20 is a flowchart for explaining a loop gain adjustment operation of the optical disk apparatus according to the sixth embodiment of the invention.
Figure 21:
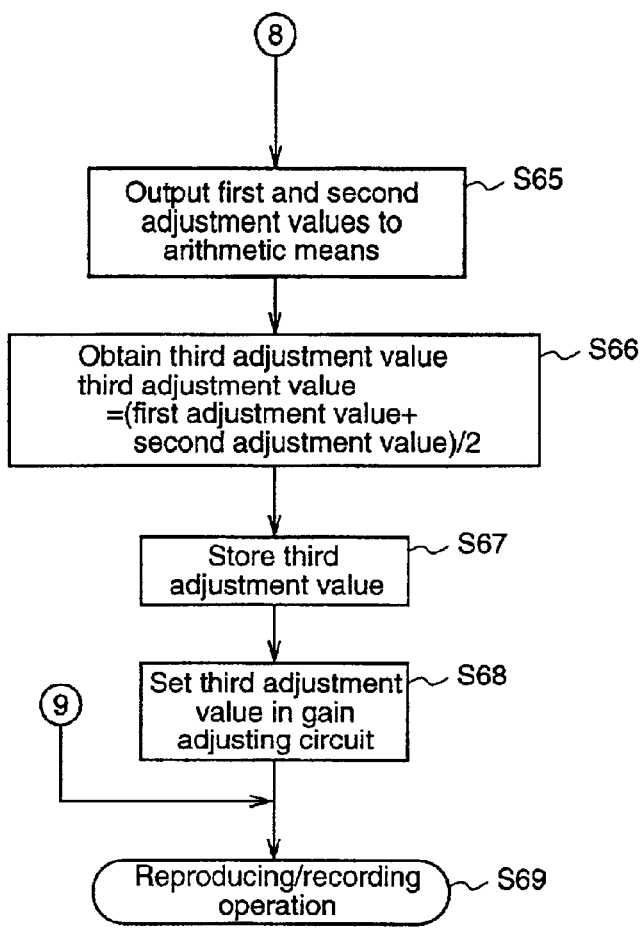
FIG. 21 is a flowchart showing a continuation of the flowchart shown in FIG. 20.

Hereinafter, an operation of the optical disk apparatus according to this embodiment will be described with reference to operation flowcharts at loop gain adjustment of the optical disk apparatus according to this embodiment shown in FIGS. 19, 20 and 21.

First, when the optical disk apparatus is started or a disk is inserted (mounted), the spindle motor is turned ON and the laser is turned ON (Step S1), thereby starting a spinup operation.

Next, a focus search operation is performed (Step S2) and determination of the optical disk type is performed (Step S3). Assume that the method for determining the optical disk type is the same as that described in the first embodiment.

When the inserted optical disk is determined to be a CD-ROM (Step S5), the operation of the loop gain adjustment is performed (Step S7) and then the operation proceeds to a reproducing operation (step s69).

When the optical disk is determined to be a CD-R or a CD-RW by the determination of the optical disk type (Step S6 or S4), it is determined by the prerecorded/recorded determination means 23 in the signal processing part 21 whether or not any recorded area exists in the optical disk (Step S61). Assume that the method for determining the presence or absence of the recorded area in the optical disk is the same as that described in the second embodiment.

When the determination of the presence or absence of the recorded area of the optical disk is ended (Step S62) and it is determined that no recorded area exists, the operation of loop gain adjustment is performed (Step S10) and then the operation proceeds to the next operation. On the other hand, when it is determined that the recorded area exists by the determination of the presence or absence of the recorded area (Step S62), the optical pickup performs seek to the recorded area, and then the loop gain adjustment is performed (Step S11).

When the loop gain adjustment is performed in the recorded area, a first adjustment value is stored in the first adjustment value storage means 24a which is constituted by a memory such as an RAM in the microcomputer 9 (Step S63).

When the loop gain adjustment in the recorded area is completed, the optical pickup is made seek a prerecorded area, and then the loop gain adjustment is performed (Step S13).

When the loop gain adjustment is performed in the prerecorded area, a second adjustment value is stored in the second adjustment value storage means 24b (Step S64).

When the loop gain adjustment is completed in the recorded area and the prerecorded area, respectively, the respective gain adjustment values stored in the first adjustment value storage means and the second adjustment value storage means are outputted to the arithmetic means 30 (Step S65), and a third adjustment value is calculated by a previously set arithmetic method in the arithmetic means 30 (Step S66).

In this embodiment, assume that the third adjustment value is obtained by the following arithmetic expression.

Third adjustment value=(first adjustment value+second adjustment value)/2.

Assuming here that, for example, the first adjustment value is −2[dB] and the second adjustment value is 4[dB], the third adjustment value is 1[dB]. The third adjustment value obtained by this method is stored in the third adjustment value storage means 24c (Step S67).

Then, the third adjustment value is set in the gain adjusting circuit in the servo part 20 (Step S68), and the optical disk apparatus starts its operation (Step S69).

As described above, in this embodiment, the third adjustment value is obtained from the first adjustment value obtained by the loop gain adjustment performed in the recorded area and the second adjustment value obtained by the loop gain adjustment performed in the prerecorded area, on the basis of a previously set arithmetic. Therefore, an optical disk apparatus which can set an adjustment value enabling to obtain a stable servo state in either of the prerecorded area and the recorded area can be obtained.

APPLICABILITY IN INDUSTRY

As described above, an optical disk apparatus according to the present invention is suited to perform reproduction/recording of an optical disk in which prerecorded areas and recorded areas are mixed.

What is claimed is:

1. An optical disk apparatus comprising:
   an optical pickup for emitting a laser to an optical disk as a recording medium and outputting a detection signal according to a reflected light from the optical disk;
   an optical disk type determination means for determining a type of the optical disk based on the detection signal;
   a focus servo control means for performing a control so as to make a convergence state of the laser emitted toward the optical disk constant, on the basis of a focus error signal which is obtained from the detection signal;
   a tracking servo control means for performing a control so that a convergence position of the optical laser is always located on a track of the optical disk, on the basis of a tracking error signal which is obtained from the detection signal;
   a gain adjusting means for performing loop gain adjustment of the focus servo control means and the tracking servo control means; and
   a driving signal outputting means for outputting a driving signal to control the optical pickup, on the basis of the focus error signal and the tracking error signal, wherein
   at start of the apparatus or mounting of the optical disk, when the type of the optical disk is determined by the optical disk type determination means to be a recordable optical disk, the optical pickup is made seek a previously set area, thereby performing loop gain adjustment.

2. The optical disk apparatus as defined in claim 1, wherein
   an area where a prerecorded or recorded disk state in the recordable optical disk has continuity is employed as the previously set area.

3. The optical disk apparatus as defined in claim 1, wherein
   a lead-in area is employed as the previously set area.

4. An optical disk apparatus comprising:
   an optical pickup for emitting a laser to an optical disk as a recording medium and outputting a detection signal according to a reflected light from the optical disk;
   an optical disk type determination means for determining a type of the optical disk based on the detection signal;
   a presence-or-absence-of-optical-disk-recorded-area determination means for determining a presence or an absence of a recorded area in the optical disk, when the optical disk is determined to be a recordable optical disk by the optical disk type determination means;

an operation area determination means for determining whether an area where the optical pickup is operating is a prerecorded area or a recorded area, based on the detection signal;

a focus servo control means for performing a control so as to make a convergence state of the optical laser emitted toward the optical disk constant, on the basis of a focus error signal which is obtained from the detection signal;

a tracking servo control means for performing a control so that a convergence position of the optical laser is always located on a track of the optical disk, on the basis of a tracking error signal which is obtained from the detection signal;

a gain adjusting means for performing loop gain adjustment of the focus servo control means and the tracking servo control means;

an adjustment value storage means which has a first adjustment value storage means and a second adjustment value storage means, each storing an adjustment value which is set in the gain adjusting means; and a driving signal outputting means for outputting a driving signal to control the optical pickup on the basis of the focus error signal and the tracking error signal, wherein at start of the apparatus or insertion of the optical disk, when the optical disk is determined to be a recordable optical disk by the optical disk type determination means and the optical disk is determined to have a recorded area by the presence-or-absence-of-optical-disk-recorded-area determination means, loop gain adjustment is performed in a recorded area and a prerecorded area of the optical disk, the first adjustment value storage means stores an adjustment value which is set in the gain adjusting means when the loop gain adjustment is performed in the recorded area, and the second adjustment value storage means stores an adjustment value which is set in the gain adjusting means when the loop gain adjustment is performed in the prerecorded area.

5. The optical disk apparatus as defined in claim 4, wherein when the optical pickup is operated in a recorded area, the adjustment value in the first adjustment value storage means is set in the gain adjusting means, and when the optical pickup is operated in a prerecorded area, the adjustment value in the second adjustment value storage means is set in the gain adjusting means.

6. The optical disk apparatus as defined in claim 4, wherein when the optical pickup is moved from a recorded area to a prerecorded area during operation, the adjustment value in the gain adjusting means is re-set from the adjustment value in the first adjustment value storage means to the adjustment value in the second adjustment value storage means, and when the optical pickup is moved from a prerecorded area to a recorded area during the operation, the adjustment value in the gain adjusting means is re-set from the adjustment value in the second adjustment value storage means to the adjustment value in the first adjustment value storage means.

7. An optical disk apparatus comprising:

an optical pickup for emitting a laser to an optical disk as a recording medium and outputting a detection signal according to a reflected light from the optical disk;

an optical disk type determination means for determining a type of the optical disk based on the detection signal;

an operation area determination means for determining whether an area where the optical pickup is operating is a prerecorded area or a recorded area, based on the detection signal;

a focus servo control means for performing a control so as to make a convergence state of the optical laser emitted toward the optical disk constant, on the basis of a focus error signal which is obtained from the detection signal;

a tracking servo control means for performing a control so that a convergence position of the optical laser is always located on a track of the optical disk, on the basis of a tracking error signal which is obtained from the detection signal;

a gain adjusting means for performing loop gain adjustment of the focus servo control means and the tracking servo control means;

an adjustment value storage means which has a first adjustment value storage means and a second adjustment value storage means, each storing an adjustment value which is set in the gain adjusting means; and a driving signal outputting means for outputting a driving signal to control the optical pickup on the basis of the focus error signal and the tracking error signal, wherein at start of the apparatus or mounting of the optical disk, when the optical disk is determined by the optical disk type determination means to be a recordable optical disk, the optical pickup performs seek to a PMA (Program Memory Area) of the optical disk, to determine a presence or an absence of the recorded area, when the optical disk is determined to have a recorded area, loop gain adjustment is performed in a recorded area and a prerecorded area of the optical disk, the first adjustment value storage means stores an adjustment value which is set in the gain adjusting means when the loop gain adjustment is performed in the recorded area, and the second adjustment value storage means stores an adjustment value which is set in the gain adjusting means when the loop gain adjustment is performed in the prerecorded area.

8. The optical disk apparatus as defined in claim 7, wherein when the optical pickup is operated in a recorded area, the adjustment value in the first adjustment value storage means is set in the gain adjusting means, and when the optical pickup is operated in a prerecorded area, the adjustment value in the second adjustment value storage means is set in the gain adjusting means.

9. The optical disk apparatus as defined in claim 7, wherein when the optical pickup is moved from a recorded area to a prerecorded area during operation, the adjustment value in the gain adjusting means is re-set from the adjustment value in the first adjustment value storage means to the adjustment value in the second adjustment value storage means, and when the optical pickup is moved from a prerecorded area to a recorded area during the operation, the adjustment value in the gain adjusting means is re-set from the adjustment value in the second adjustment value storage means to the adjustment value in the first adjustment value storage means.

10. An optical disk apparatus comprising:
an optical pickup for emitting a laser to an optical disk as a recording medium and outputting a detection signal according to a reflected light from the optical disk;
an optical disk type determination means for determining a type of the optical disk based on the detection signal;
a focus servo control means for performing a control so as to make a convergence state of the laser emitted toward the optical disk constant, on the basis of a focus error signal which is obtained from the detection signal;
a tracking servo control means for performing a control so that a convergence position of the optical laser is always located on a track of the optical disk, on the basis of a tracking error signal which is obtained from the detection signal;
a gain adjusting means for performing loop gain adjustment of the focus servo control means and the tracking servo control means;
an adjustment value storage means for storing an adjustment value which is obtained by the loop gain adjustment;
a post-loop-gain-adjustment-area determination means for determining whether an area where the loop gain adjustment has been performed is an prerecorded area or a recorded area;
an operation area determination means for determining whether an area where the optical pickup is operating is an prerecorded area or a recorded area, on the basis of the reflected light;
a correction value storage means for storing a previously set positive gain correction value; and
a driving signal outputting means for outputting a driving signal to control the optical pickup, on the basis of the focus error signal and the tracking error signal, wherein
when a disk state of an area where the optical pickup is made perform seeking and a reproducing or recording operation is performed, which state has been determined by the operation area determination means, is different from a disk state of the area where the loop gain adjustment has been performed, which state has been determined by the post-loop-gain-adjustment-area determination means, the previously set gain correction value is subjected to a previously set arithmetic and then set in the gain adjusting means.

11. The optical disk apparatus as defined in claim 10, wherein
when an area where the loop gain adjustment has been performed at start of the apparatus or mounting of the optical disk is a prerecorded area and an area where the optical pickup operates is a recorded area, the gain correction value which is set in the gain adjusting means has the same value as the previously set positive gain correction value, and
when an area where the loop gain adjustment has been performed at start of the apparatus or insertion of the optical disk is a recorded area and an area where the optical pickup operates is a prerecorded area, a gain correction value which is set in the gain adjusting means has a value which is obtained by multiplying the previously set gain correction value by "−1".

12. The optical disk apparatus as defined in claim 10, wherein
when the gain is changed during the operation of the optical pickup, re-correction of the gain is performed in the gain adjusting means by employing the previously set gain correction value.

13. An optical disk apparatus comprising:
an optical pickup for emitting a laser to an optical disk as a recording medium and outputting a detection signal according to a reflected light from the optical disk;
an optical disk type determination means for determining a type of the optical disk based on the detection signal;
a focus servo control means for performing a control so as to make a convergence state of the laser emitted toward the optical disk constant, on the basis of a focus error signal which is obtained from the detection signal;
a tracking servo control means for performing a control so that a convergence position of the optical laser is always located on a track of the optical disk, on the basis of a tracking error signal which is obtained from the detection signal;
a gain adjusting means for performing loop gain adjustment of the focus servo control means and the tracking servo control means;
an adjustment value storage means for storing an adjustment value which is obtained by the loop gain adjustment;
a post-loop-gain-adjustment-area determination means for determining whether an area where the loop gain adjustment has been performed is an prerecorded area or a recorded area;
an operation area determination means for determining whether an area where the optical pickup is operating is an prerecorded area or a recorded area, on the basis of the detection signal;
a correction value storage means which has a first gain correction value storage means for storing a previously set positive first gain correction value and a second gain correction value storage means for storing a previously set negative second gain correction value; and
a driving signal outputting means for outputting a driving signal to control the optical pickup on the basis of the focus error signal and the tracking error signal, wherein
when a disk state of the area where the optical pickup is made perform seeking and a reproducing or a recording operation is performed, which state has been determined by the operation area determination means, is different from a disk state of the area where the loop gain adjustment has been performed, which state has been determined by the post-loop-gain-adjustment-area determination means, the previously set first gain correction value or second gain correction value is set in the gain adjusting means.

14. The optical disk apparatus as defined in claim 13, wherein
when an area where the loop gain adjustment has been performed at start of the apparatus or mounting of the optical disk is a prerecorded area and an area where the optical pickup operates is a recorded area, the gain correction value which is set in the gain adjusting means is the first gain correction value, and
when an area where the loop gain adjustment has been performed at start of the apparatus or insertion of the optical disk is a recorded area and an area where the optical pickup operates is a prerecorded area, the gain correction value which is set in the gain adjusting means is the second gain correction value.

15. The optical disk apparatus as defined in claim 13, wherein
when the gain is changed during the operation of the optical pickup, re-correction of the gain is performed in the gain adjusting means by employing the previously set gain correction value.

16. An optical disk apparatus comprising:

an optical pickup for emitting a laser to an optical disk as a recording medium and outputting a detection signal according to a reflected light from the optical disk;

an optical disk type determination means for determining a type of the optical disk based on the detection signal;

a presence-or-absence-of-recorded-area determination means for determining a presence or an absence of a recorded area in the optical disk, when the optical disk is determined to be a recordable optical disk by the optical disk type determination means;

an operation area determination means for determining whether an area where the optical pickup is operating is an prerecorded area or a recorded area, on the basis of the detection signal;

a focus servo control means for performing a control so as to make a convergence state of the optical laser emitted toward the optical disk constant, on the basis of a focus error signal which is obtained from the detection signal;

a tracking servo control means for performing a control so that a convergence position of the optical laser is always located on a track of the optical disk, on the basis of a tracking error signal which is obtained from the detection signal;

a gain adjusting means for performing loop gain adjustment of the focus servo control means and the tracking servo control means;

an adjustment value storage means which has a first adjustment value storage means, a second adjustment storage means and a third adjustment value storage means, each storing an adjustment value set in the gain adjusting means;

an arithmetic means for operating a third adjustment value by employing a first adjustment value stored in the first adjustment value storage means and a second adjustment value stored in the second adjustment value storage means; and a driving signal outputting means for outputting a driving signal to control the optical pickup, on the basis of the focus error signal and the tracking error signal, wherein when the optical disk is determined to be a recordable optical disk by the optical disk type determination means at start of the apparatus or insertion of the optical disk, and further the optical disk is determined to have a recorded area by the presence-or-absence-of-optical-disk-recorded-area determination means, loop gain adjustment is performed in a recorded area and a prerecorded area of the optical disk, a previously decided arithmetic is performed in the arithmetic means by employing the first adjustment value and the second adjustment value, and the third adjustment value which is obtained by the arithmetic is stored in the third adjustment value storage means.

17. The optical disk apparatus as defined in claim 16, wherein when the optical pickup is made perform a reproduction/recording operation, the third adjustment value stored in the third adjustment value storage means is set in the gain adjusting means.

* * * * *